United States Patent [19]
Ohta

[11] Patent Number: 5,101,276
[45] Date of Patent: Mar. 31, 1992

[54] ELECTRONIC STILL CAMERA CAPABLE OF COMPENSATING FOR VARIATIONS IN LUMINANCE LEVELS WITHIN A FIELD BEING PHOTOGRAPHED

[75] Inventor: Yoshitaka Ohta, Hachioji, Japan

[73] Assignee: Konica Corporation, Tokyo, Japan

[21] Appl. No.: 758,447

[22] Filed: Sep. 5, 1991

Related U.S. Application Data

[63] Continuation of Ser. No. 491,689, Mar. 9, 1990, abandoned.

[30] Foreign Application Priority Data

| Mar. 16, 1989 | [JP] | Japan | 1-64979 |
| Mar. 24, 1989 | [JP] | Japan | 1-70409 |
| Apr. 7, 1989 | [JP] | Japan | 1-89237 |
| Apr. 13, 1989 | [JP] | Japan | 1-94065 |

[51] Int. Cl.$^5$ .............. H04N 3/14; H04N 5/335; H04N 5/30
[52] U.S. Cl. .............. 358/213.19; 358/209; 358/909
[58] Field of Search .............. 358/213.31, 213.19, 358/213.29, 909, 209, 213.24

[56] References Cited

U.S. PATENT DOCUMENTS

| 4,529,301 | 7/1985 | Rountree | 355/77 |
| 4,614,966 | 9/1986 | Yunoki et al. | 358/44 |
| 4,647,975 | 3/1987 | Alston et al. | 358/209 |
| 4,707,743 | 11/1987 | Tokumitsu et al. | 358/213.13 |
| 4,851,915 | 7/1989 | Yang et al. | 358/213.19 |
| 4,951,147 | 8/1990 | Aknar et al. | 358/209 |

Primary Examiner—James J. Groody
Assistant Examiner—Safet Metjahic
Attorney, Agent, or Firm—Jordan B. Bierman

[57] ABSTRACT

An electronic still camera wherein exposures of different exposure times are accomplished at overlapped timings by controlling sweeping and reading operations of two fields to be exposed by the image pickup device, independently of each field so that the images thus exposed are recorded. Two images are recorded by exposing an object in conformity to one specific and another luminances if the luminance difference is large. When a plurality of images are to be continuously recorded by varying exposure conditions, signals of second and later images are recorded only at its region, in which signal levels are within a proper range, but are outside of the proper range in the preceding image. Luminance area detecting devices for detecting each area of a photographic frame, divided according to luminance level of image pickup signals detected by an image pickup device during photographing under a set condition are provided, and exposure control devices for controlling the exposure at the time of photographing so that a luminance region occupying a large area detected may take a proper signal level are provided.

8 Claims, 29 Drawing Sheets

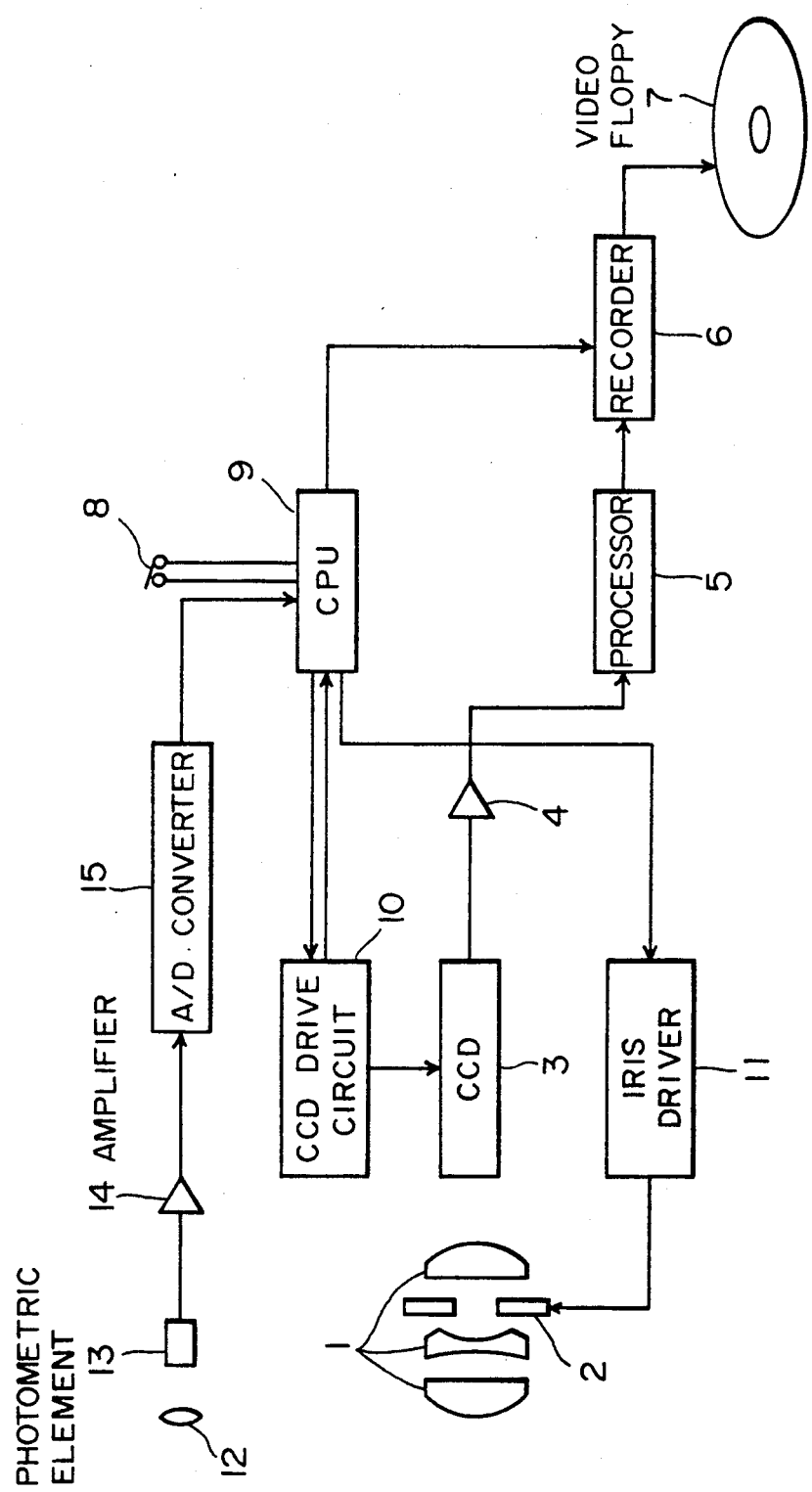

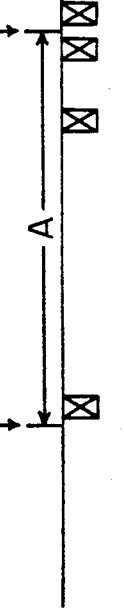
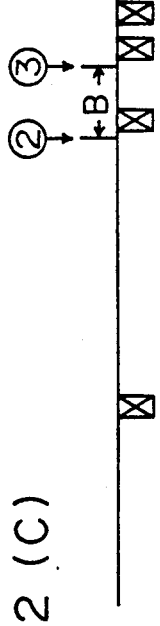

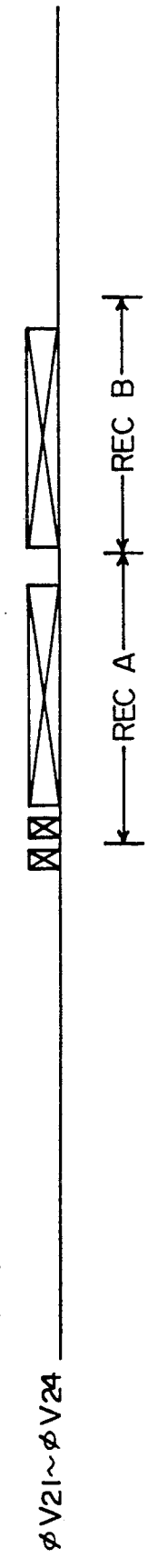
FIG. 4(A) VSYNC
FIG. 4(B) φV11
FIG. 4(C) φV13
FIG. 4(D) φV12, φV14
FIG. 4(E) φV21~φV24

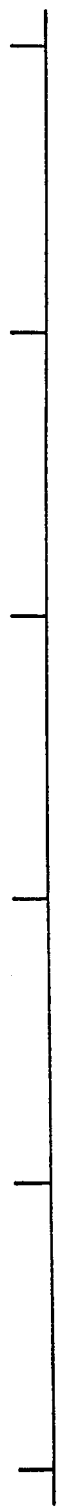
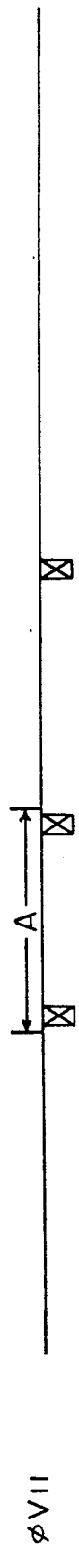
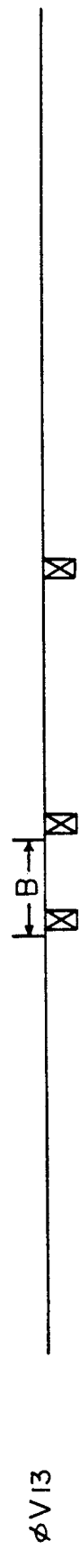
FIG. 6(A) VSYNC
FIG. 6(B) φV11
FIG. 6(C) φV13
FIG. 6(D) φV12, φV14
FIG. 6(E) φV21~φV24

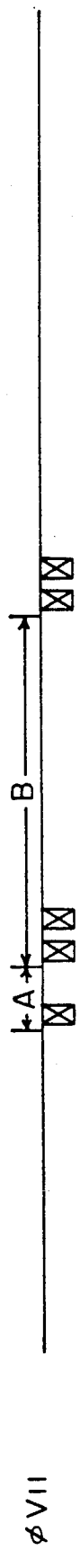
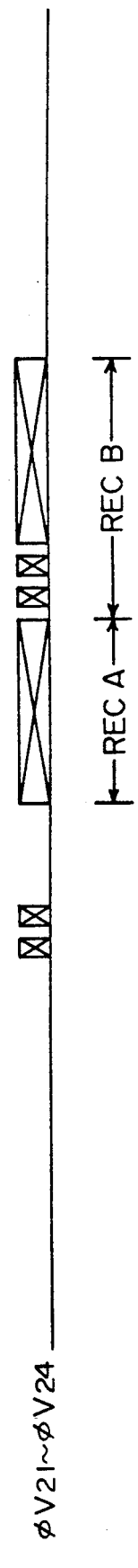
F I G. 5 (A) VSYNC
F I G. 5 (B) φV11
F I G. 5 (C) φV13
F I G. 5 (D) φV12, φV14
F I G. 5 (E) φV21~φV24

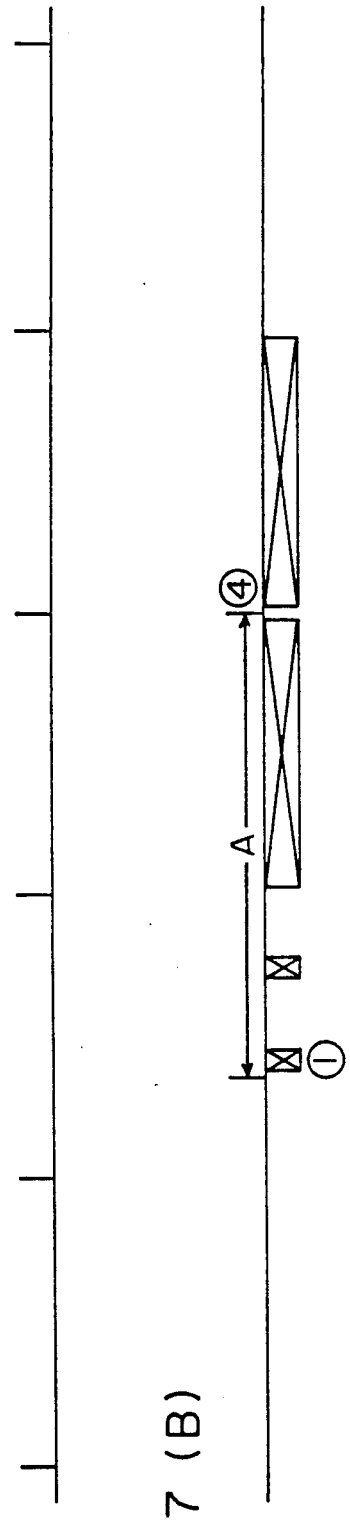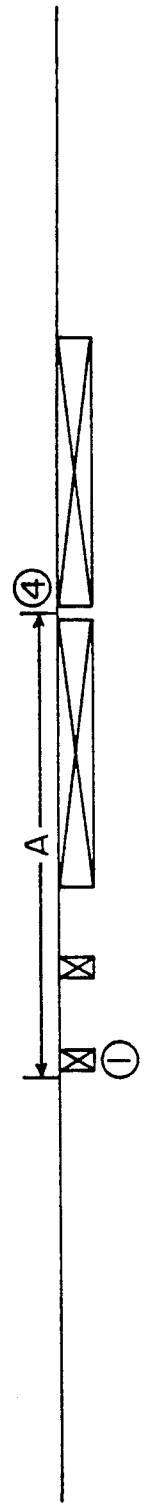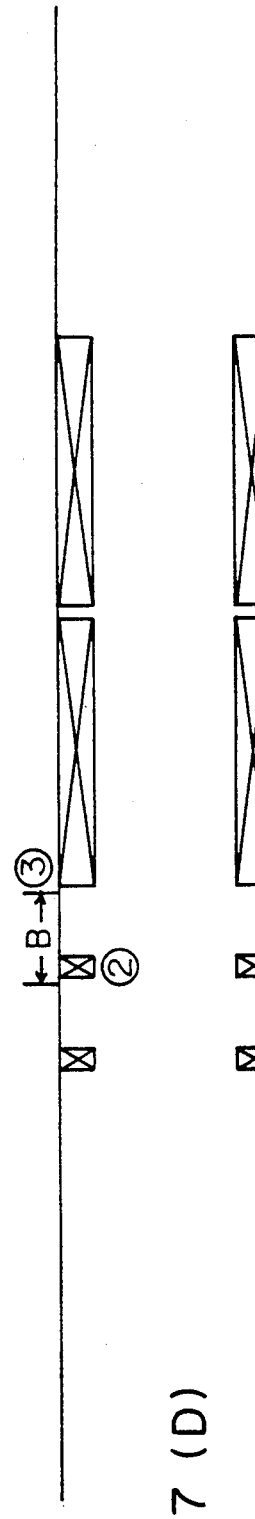
F I G. 7 (A) VSYNC
F I G. 7 (B) φV11
F I G. 7 (C) φV13
F I G. 7 (D) φV12, φV14

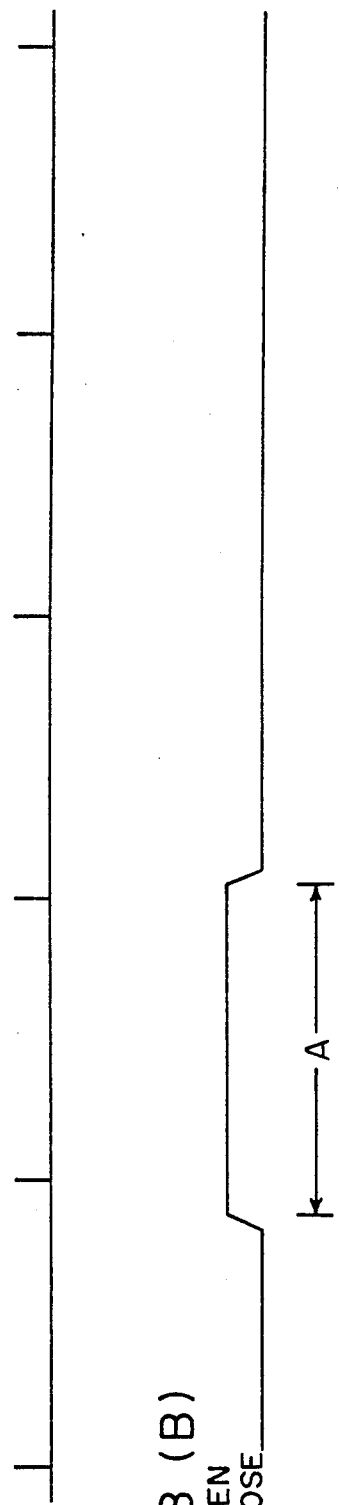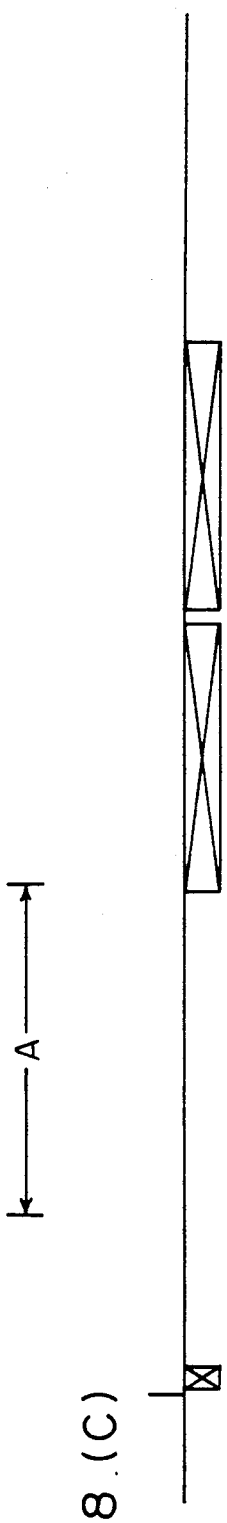

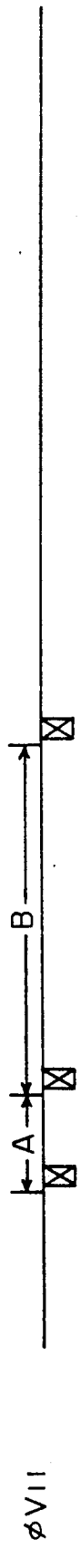
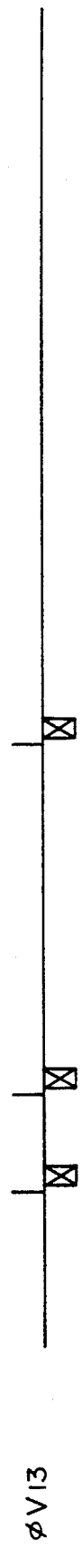
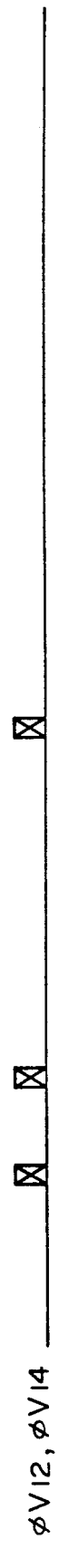
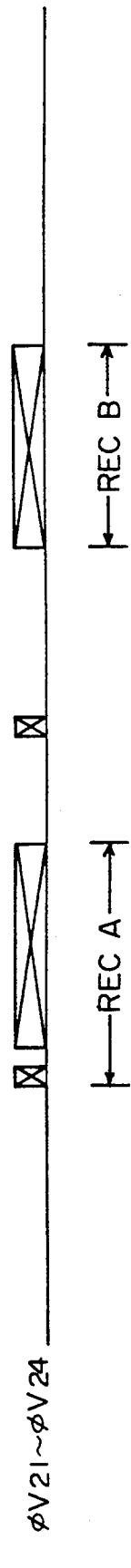
F I G. 9 (A) VSYNC
F I G. 9 (B) φV11
F I G. 9 (C) φV13
F I G. 9 (D) φV12, φV14
F I G. 9 (E) φV21~φV24

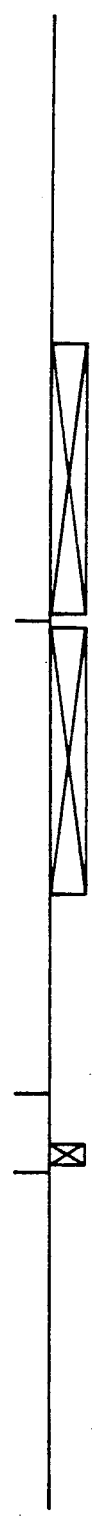
F I G. 10 (A) VSYNC
F I G. 10 (B) φV11
F I G. 10 (C) φV13
F I G. 10 (D) φV12, φV14

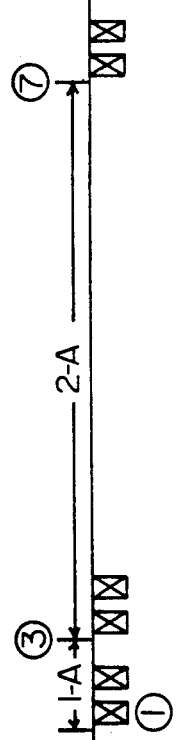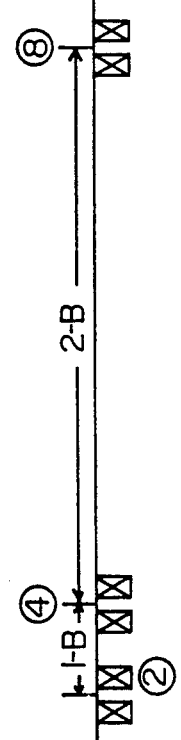

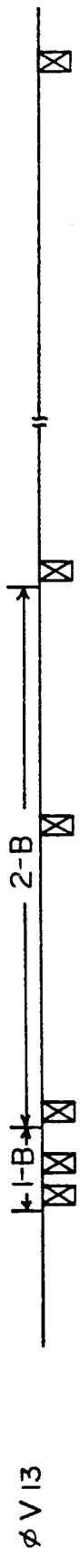
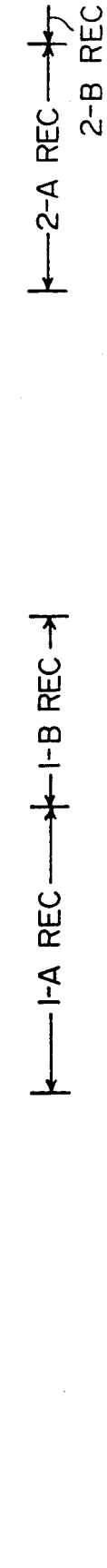
FIG. 12(A) VSYNC
FIG. 12(B) φV11
FIG. 12(C) φV13
FIG. 12(D) φV12, φV14
FIG. 12(E) φV21~φV24

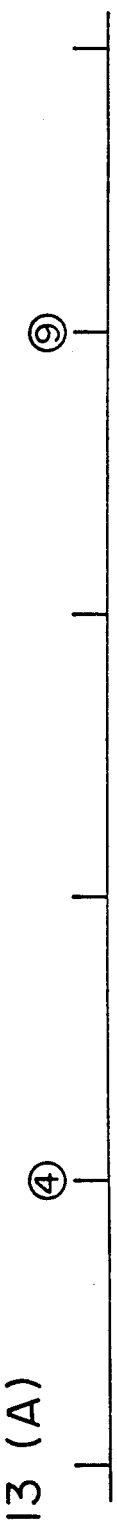
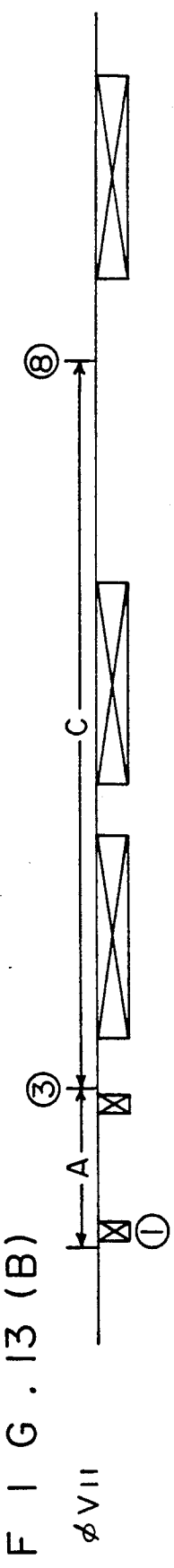
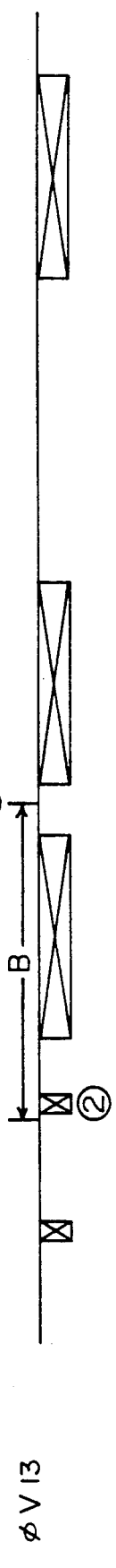
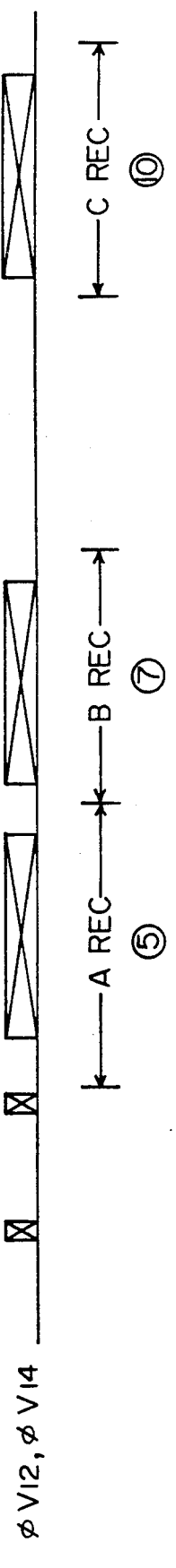

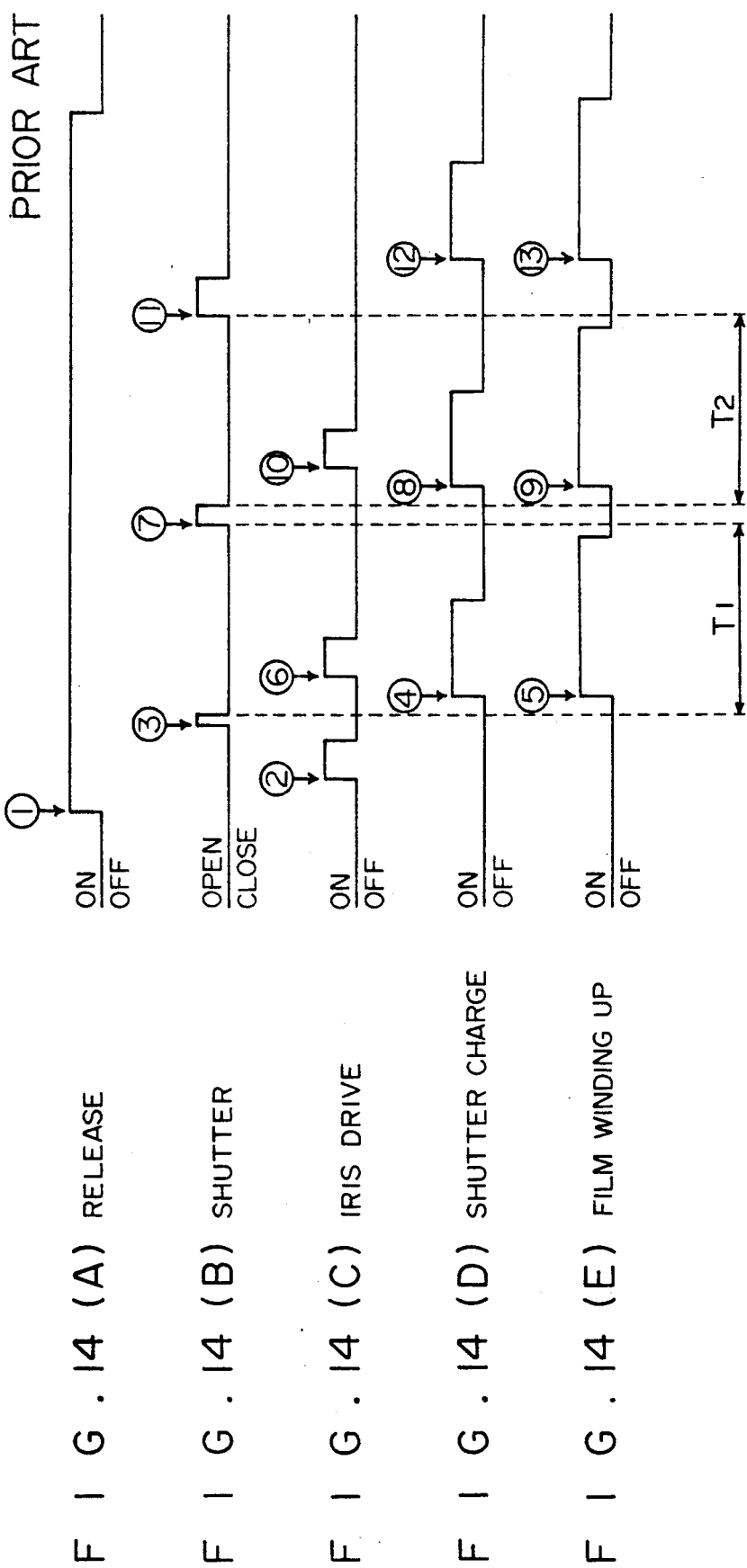

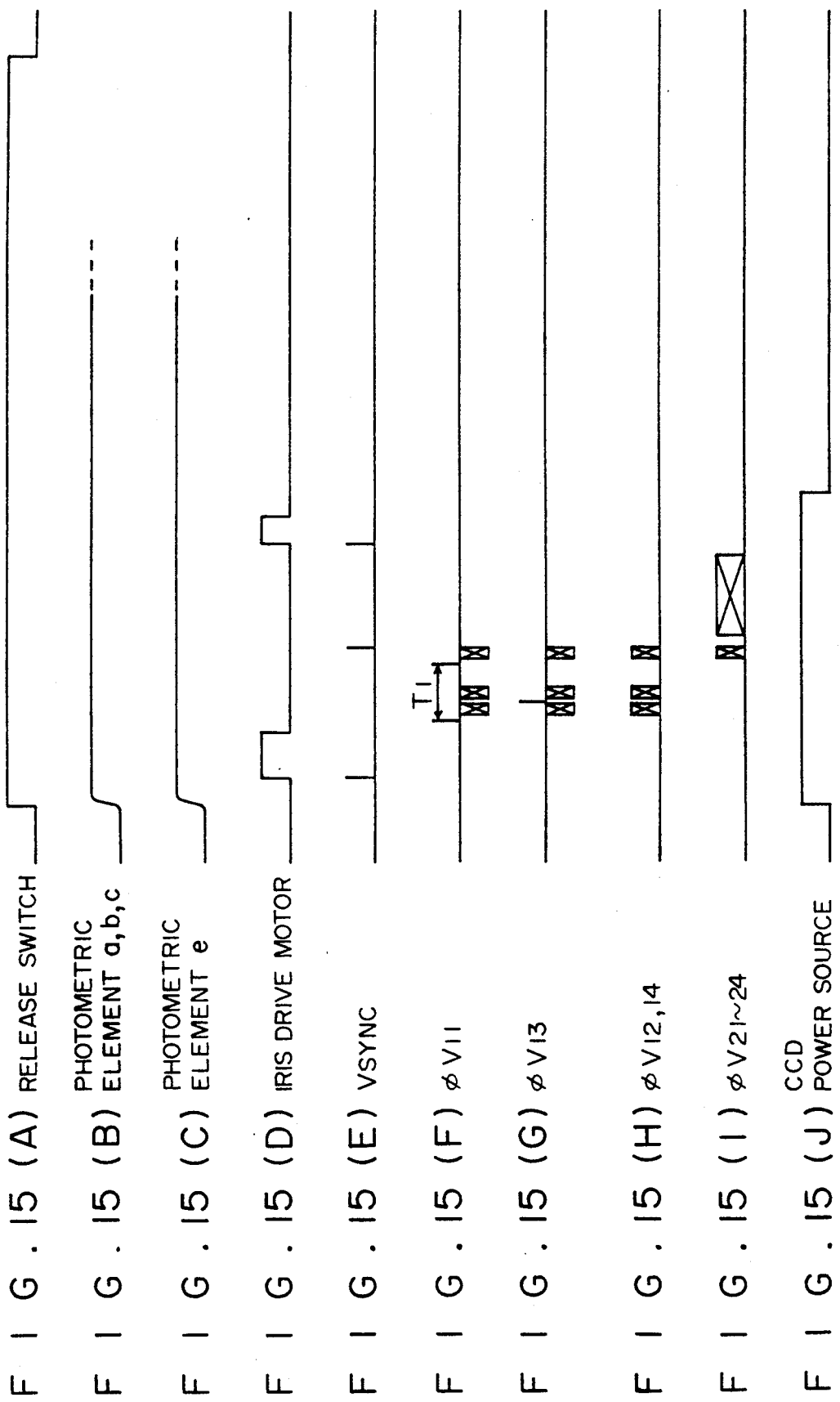

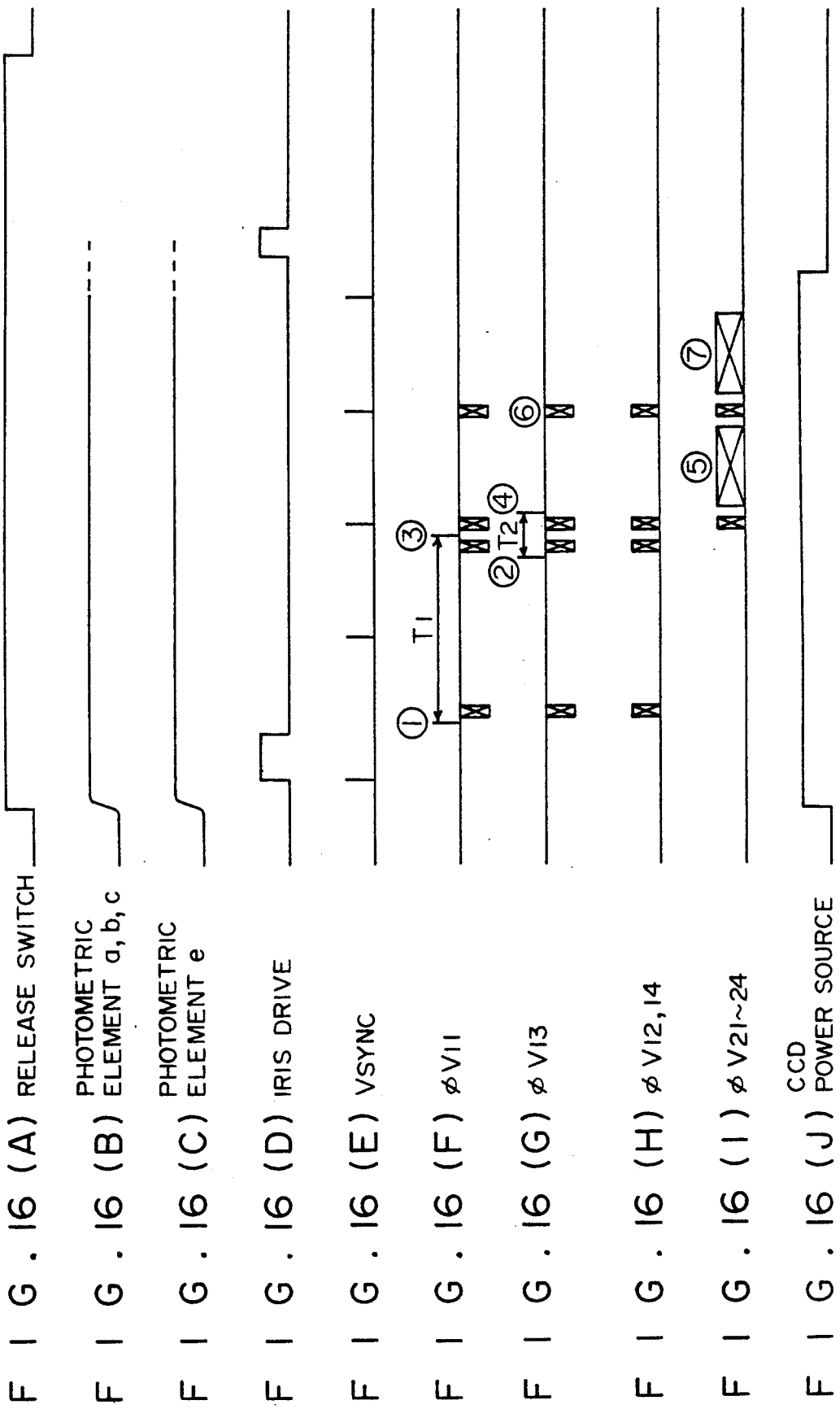

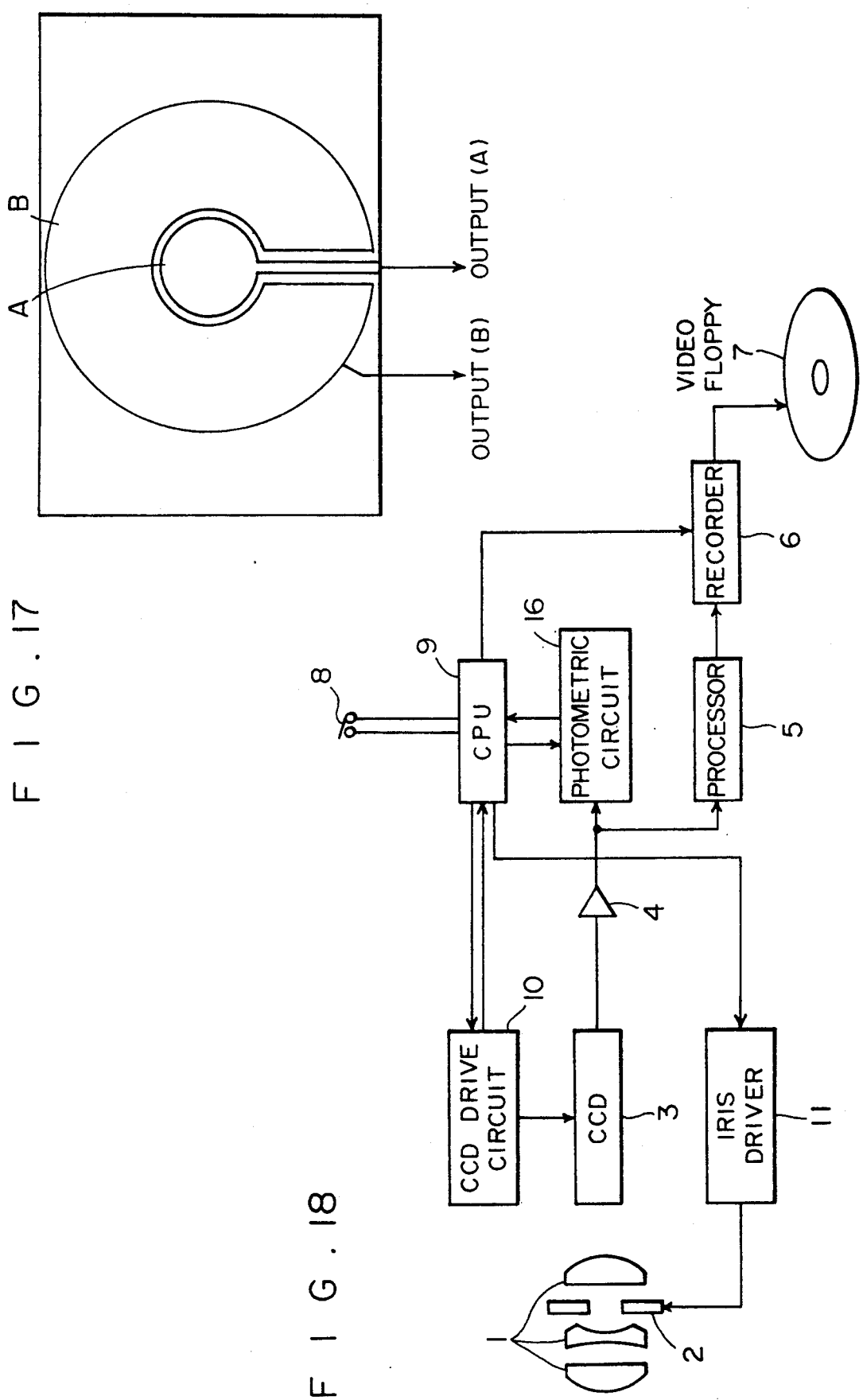

F I G. 19
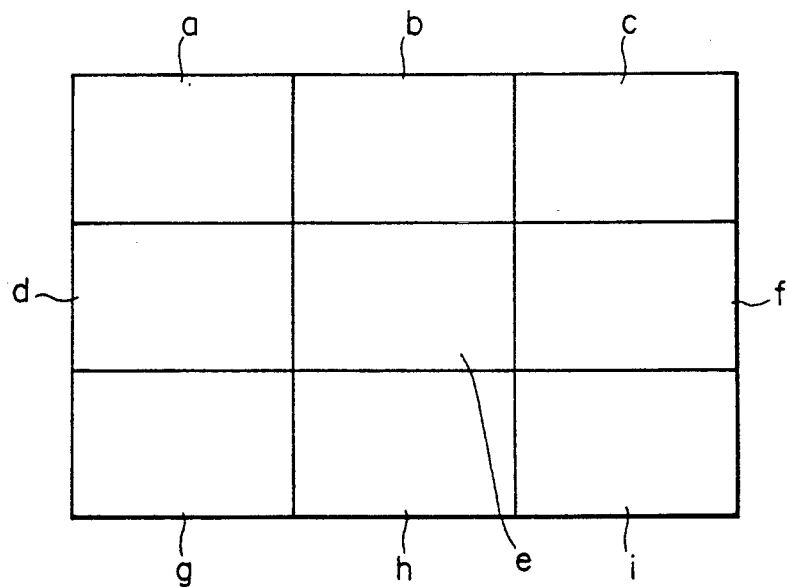
F I G. 20
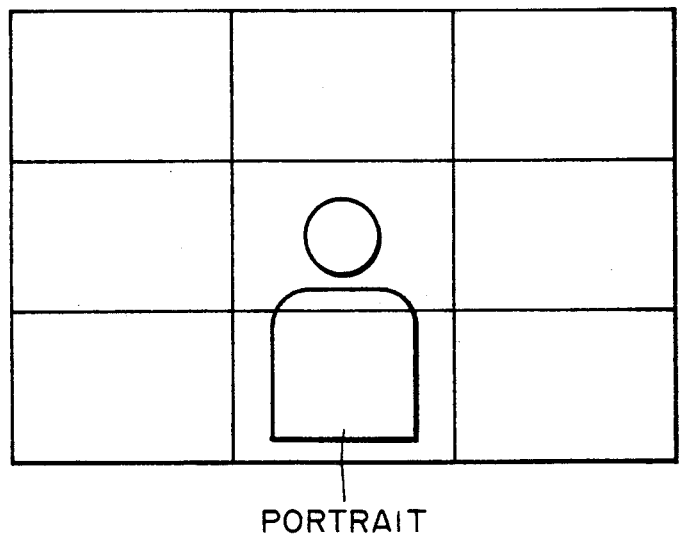
PORTRAIT

F I G . 27
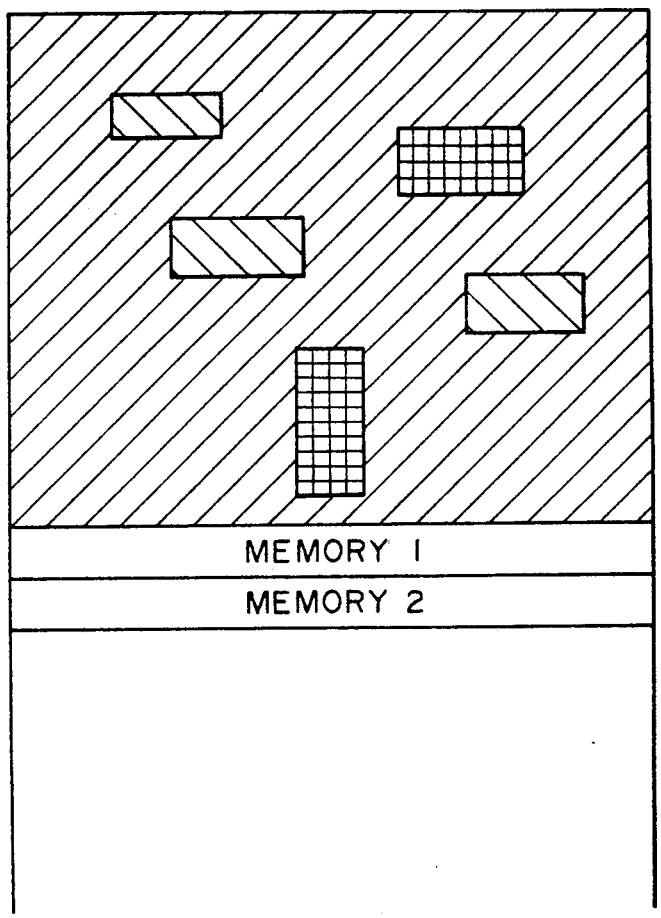
 FIRST IMAGE DATA
 SECOND IMAGE DATA
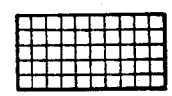 THIRD IMAGE DATA

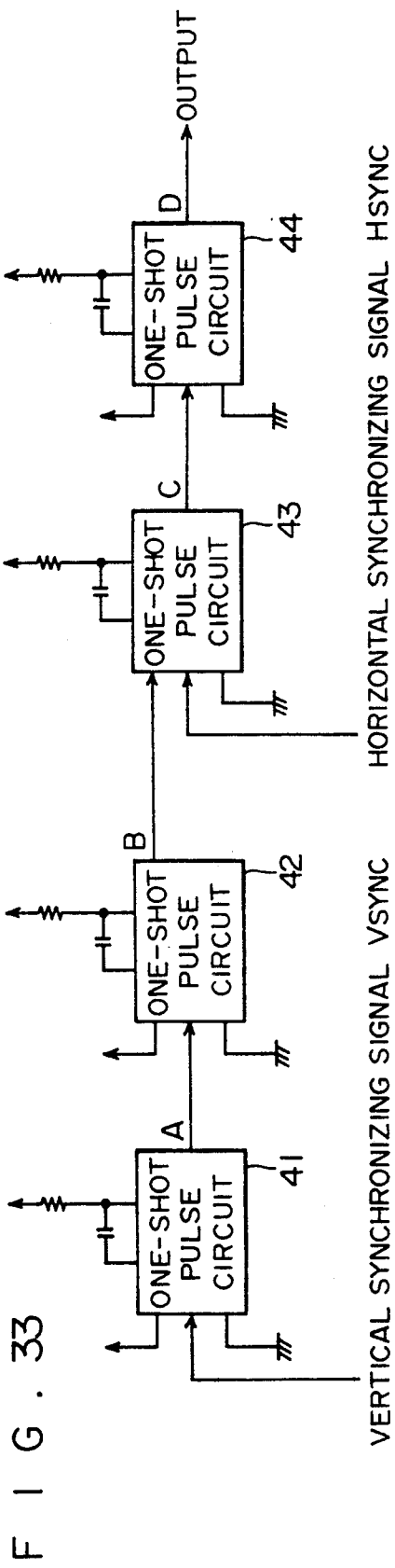
F I G. 33
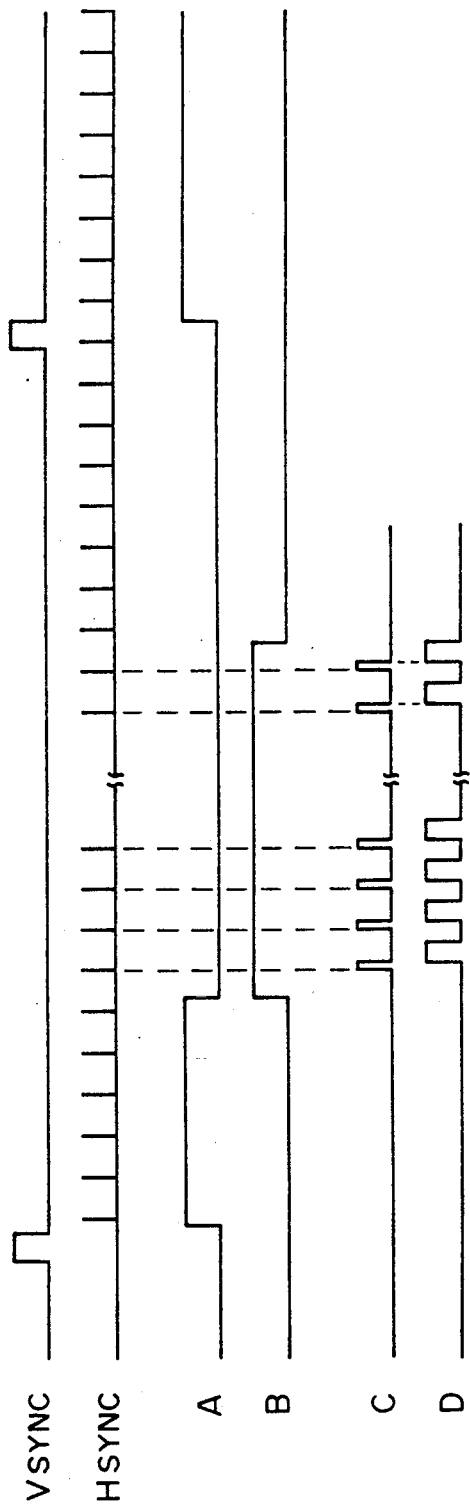
F I G. 34

FIG. 35
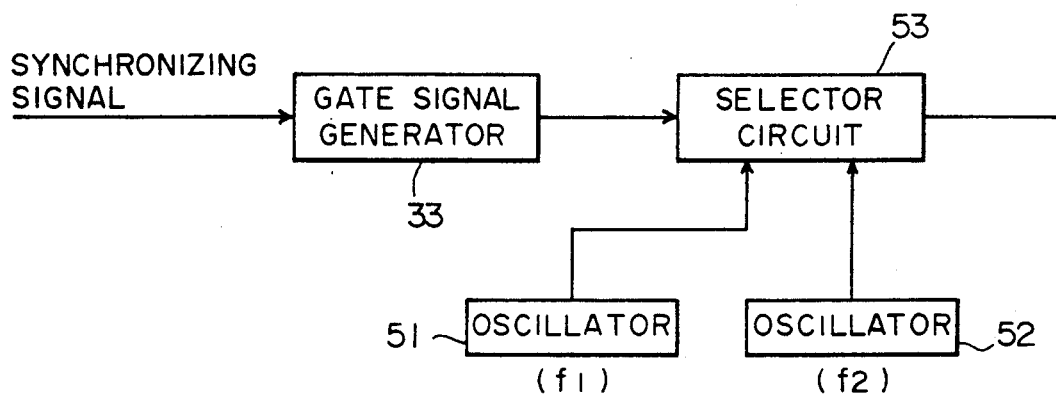
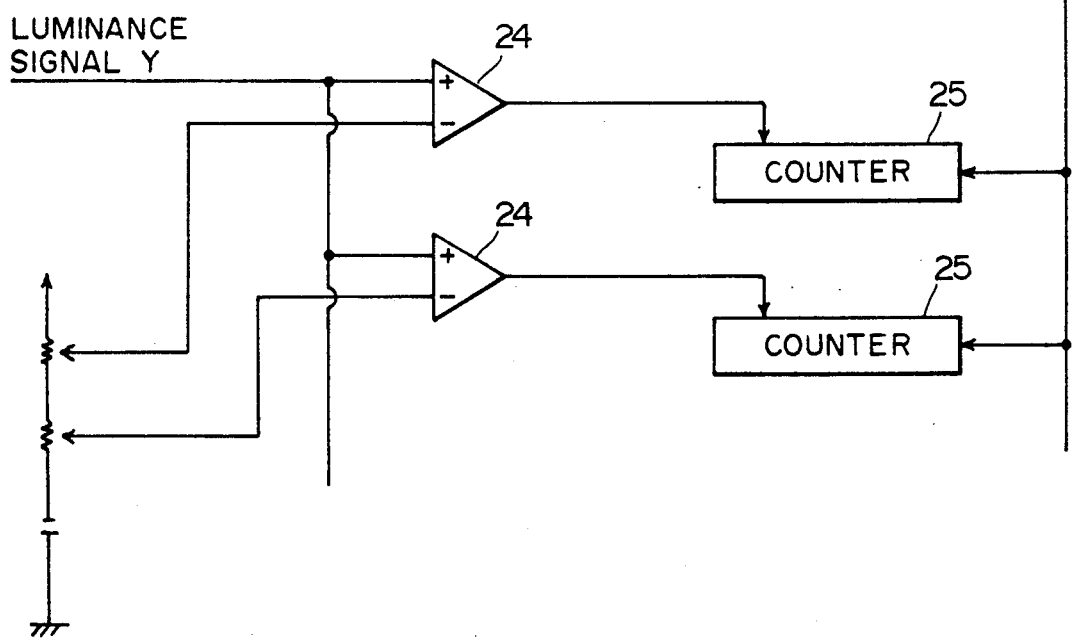
FIG. 36
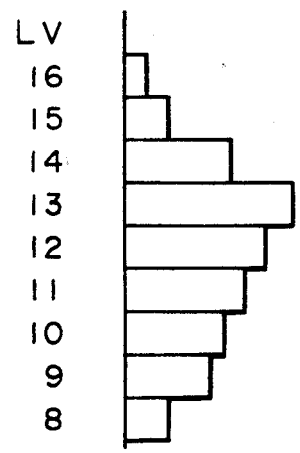

ELECTRONIC STILL CAMERA CAPABLE OF COMPENSATING FOR VARIATIONS IN LUMINANCE LEVELS WITHIN A FIELD BEING PHOTOGRAPHED

This application is a continuation of application Ser. No. 27/491,689 filed 3/09/90, now abandoned.

BACKGROUND OF THE INVENTION

1. Field of the Invention

The present invention relates to an electronic still camera for bracketing a plurality of images having different exposures and, more particularly, to an electronic still camera capable of photographing the plural images at superposed or continuous timings.

2. Description of the Prior Art

In order to obtain an image of optimum exposure, the auto-bracketing may be accomplished for taking a plurality of images of different exposures by a series of operations.

In response to only one depression of a shutter button, for example, the camera itself takes a plurality of shots continuously with varying exposures. If these continuous shots are to be interrupted, the shutter button may be released.

In the case of the auto-bracketing described above, the individual images have slightly different exposure timings. This raises no problem if the object stands still. In the case of a moving object, however, the desired taking timing (i.e., the so-called "shutter chance") is missed even if the shot taken at the instant of depression of the shutter button has an improper exposure and following shot has a proper exposure.

FIGS. 14(A)-14(E) are time charts showing the shutter timings. When the release switch is depressed (or ON, as indicated at ① in FIG. 14(A)), the iris drive motor for adjusting the iris is energized (as indicated at ② FIG. 14(C)). After this, the shutter is opened (as indicated at ③ in FIG. 14(B)) to effect the first exposure. This exposure time is slightly shorter than the proper exposure time, for example. At the end of this exposure, there are accomplished the shutter charge (as indicated at ④ in FIG. 14(D)), the film winding (as indicated at ⑤ in FIG. 14(E)) and the iris drive (as indicated at ⑥ in FIG. 14(C)). Then, the shutter is opened again (as indicated at ⑦ in FIG. 14(B)) to effect the second exposure. This exposure time is set to have the proper exposure time, for example. At the end of this exposure, there are accomplished the shutter charge (as indicated at ⑧ in FIG. 14(D)), the film winding (as indicated at ⑨ in FIG. 14(E)) and the iris drive (as indicated at 14 in FIG. 14(C)). Then, the shutter is opened again (as indicated at 11 in FIG. 14(B)) to effect the third exposure. This exposure time is slightly longer than the proper exposure time, for example. At the end of this exposure, the shutter charge (as indicated at 12 in FIG. 14(D) and the film winding (as indicated at 13 in FIG. 14(E)) are accomplished for preparing a subsequent photographing. Thus, three shots of different exposures are executed while the release switch is ON. Incidentally, letters $T_1$ and $T_2$ appearing in FIGS. 141A)-14(E) designate the time periods for which the shutter is closed till it is opened.

Here, the camera thus far described is required to have the time periods of $T_1$ and $T_2$ of 200 to 300 msecs or more. In the case of the moving object, therefore, the photographing of the proper exposure may possibly come out of the desired taking timing (or the so-called "shutter chance").

In case, moreover, an exposure meter is built in the camera, it is very important problem how the light-receiving element is arranged and what sensitivity distribution (i.e., the sensitivity of the light in each position of the frame and in the luminance distribution pattern) the brightness of the object is to be measured in.

Therefore, there has been used the multi-division photometric system in which the finder frame is divided into a plurality of regions so that it may be measured by the photometric element. FIG. 19 is an explanatory view showing the manner of dividing the frame by the multi-division photometric system. In this example, as shown, the whole frame is divided into nine photometric regions. Of these, the central region is used for the photometry of the main object whereas the surrounding eight regions are used for the photometry of the background.

FIG. 20 presents an example of the finder frame in case a portrait is to be centralized for photographing. In case the object is thus taken against the light, the background receives a larger amount of light whereas the central region or the object receives a smaller amount of light. In this case, the photometric value is calculated (at the central spot) by using not the photometric information of the background but only the photometric information of the center. As stated above, the automatic exposure (AE) is executed while accomplishing the compensation with the backlight.

In addition, the photometry includes the averaged photometry, the central weighted photometry, the high-luminance stressed photometry and the low-luminance stressed photometry for exposure controls, of which the most proper one is selected in accordance with the luminance distribution pattern.

No complete algorithm exists in the exposure controls thus far described. In other words, an algorithm capable of correcting a certain luminance distribution properly might deteriorate another luminance distribution.

In a pattern having an object of lower luminance surrounded by an object of higher luminance, for example, the compensation with the backlight will adjust the exposure to the portion of lower luminance. According to the algorithm of an intense correction with the backlight, however, the exposure is adjusted to the hair, if any in a bright cloth or face, so that the cloth or face will be blanked white. If this blanking were prevented, the correction with the backlight would become ineffective.

In the electronic still camera, generally speaking, the film is replaced by a solid-state image pickup device (which will be called hereinafter as the "CCD") and a magnetic floppy. The CCD photoelectrically converts the light received at its light receiving portion into electric charges and stores the charges in the depletion layer of the substrate of the CCD. On the other hand, a magnetic disc in a magnetic recorder rotates the disc-shaped magnetic floppy to store still images of 50 frames in response to the motions of the head.

In case a film having a narrow latitude such as a positive film is used in a silver halide camera, a plurality of shots are frequently taken for one object under different exposure conditions so as to produce an accurately exposed photograph. This is called the "bracketing." In order to simplify this bracketing, some recent camera is enabled to accomplish the changes in the exposure conditions, the film feed and the photography automatically if the change in the exposure and the number of the shots are set. This technology is called the "auto-bracketing". The bracketing is effective for the electronic still camera because its solid-state image pickup device has a narrow latitude.

In this electronic still camera of the prior art, however, the auto-bracketing requires the use of tracks of the magnetic floppy in the number of bracketed shots.

In the automatic exposure control (which will be shortly referred to as the "AE") of the existing video camera, on the other hand, the extent of iris and the exposure time are so controlled that the values obtained by integrating and averaging the luminance signal levels of the whole image pickup frame detected by the image pickup device may take a proper level. In the other way, the central portion of the frame is weighted, and the luminance signal levels are integrated to control the extent of iris and the exposure time.

In another technology, the frame is divided into a plurality of regions, for which the luminance signal levels are respectively integrated and are subjected to comparisons and weighted additions (including the corrections with the backlight) to control the extent of iris and the exposure time. In the silver halide film type camera, similar operations are accomplished by using the signal outputs of a photometric element provided.

There are other technologies, in which abnormal levels in the vicinity of the saturation level or black level are detected from the luminance signal levels so that the exposure conditions for the lowest abnormal level may be set from a plurality of shots picked up (as disclosed in Japanese Patent Laid-Open No. 60-178779), and in which two shots are taken with the exposures adjusted to set the white and black levels to the grey levels so that the individual photographic signals are synthesized and reproduced (as disclosed in Japanese Patent Laid-Open No. 60-246186).

In the existing system using a value obtained by integrating and averaging the luminance signal levels of the whole image pickup frame, however, the integrated value is increased by the influences of the portion, if any, which has an extremely high luminance in a portion of the frame. As a result, the frame is made dim as a whole by the exposure control referring to the average value. Since, moreover, the exposure control is accomplished in conformity to the average value of the high- and low-luminance portions, there arises a tendency that the high-luminance portion becomes so bright as to blank the image white.

In the case of the exposure control having the central portion or regions weighted, on the other hand, that tendency is considerably removed, if the portion having an extremely high luminance exists outside of the highly weighted portion, but cannot be solved if it exists inside.

In Japanese Patent Laid-Open No. 60-178779, the exposure conditions are determined by extracting the abnormal level only, so that the image pickup conditions have to be changed in various manners to take a long time for the determination. In case the frame is divided into a dark portion, a bright portion (i.e., a main object) and an extremely bright portion (into which the light source is included), as disclosed in Japanese Patent Laid-Open No. 60-246186, for example, the main object becomes dark for the photographing at the white level because the exposure is adjusted to the extremely bright portion. For the photographing at the black level, on the contrary, the main object is blanked white because the exposure is adjusted to the dark portion. In case the image is spotted extremely bright or dark even if it is synthesized and reproduced, the main object becomes blacky or whitish so that an excellent image is not obtained. In this system, the iris is moved while checking the peak values of the white and black levels for the photographing conforming to the individual levels until the photographing is accomplished at the proper level. Therefore, it takes a long time to take two shots, and the exposure timing of this photographing is highly deviated.

SUMMARY OF THE INVENTION

The present invention has an object to realize an electronic still camera capable of auto-bracketing at simultaneous or superposed timings.

In order to achieve the above-specified object, according to the present invention, there is provided an electronic still camera which comprises an image pickup device for photographing a plurality of images having different exposure times, wherein the improvement resides in that exposures of different exposure times are accomplished at overlapped or continuous timings by controlling sweeping and reading operations of two fields to be exposed by said image pickup device, independently of each field so that the images thus exposed are recorded.

In the electronic still camera of the present invention, the sweeping and reading operations of the two fields to be exposed by the image pickup device are controlled independently of each other so that the exposures of different exposure times are accomplished at the overlapped or continuous timings, whereby the images thus exposed are recorded.

Another object of the present invention is to provide an electronic still camera capable of recording images with excellent exposures independently of the luminance distribution pattern of the frame.

In order to achieve the above-specified object, according to the present invention, there is provided an electronic still camera which has a function to detect a luminance of an object thereby to accomplish an automatic exposure adjustment with reference to a specific luminance range of object having large luminance difference, wherein the improvement resides in that two images are recorded by exposing the object in conformity to one specific and another luminances if the luminance difference is large.

In the electronic still camera of the present invention, if the luminance difference of the object is large, the exposures are accomplished in conformity to the one and another luminances to record the two images.

Still another object of the present invention is to provide an electronic still camera which can accomplish the bracketing while suppressing the memory capacity consumption.

In order to achieve the above-specified object, according to the present invention, there is provided an electronic still camera for digitizing video signals to record them in a recording medium, wherein the improvement resides in that, when a plurality of images are to be continuously recorded by varying exposure conditions, signals of second and later images are recorded only at its region, in which signal levels are within a proper range, but are outside of the proper range in the preceding images.

In the electronic still camera of the present invention, the video signals of the solid black and white portions in the video signals composing an image frame taken under standard photographic conditions are recorded from those which are obtained from a later shot by varying the photographic conditions.

A further object of the present invention is to provide an exposure control device for a camera, which has been conceived to solve the problem of the exposure control system of the prior art by making an exposure control such that a region at a proper signal level may occupy the largest ratio.

According to the present invention, there is provided an exposure control device for a camera, comprising luminance area detecting means for detecting each area of a photographic frame divided according to luminance level of image pickup signals detected by an image pickup device during photographing under a set condition, and exposure control means for controlling the exposure at the time of photographing so that a luminance region occupying a large area detected may take a proper signal level.

Moreover, the luminance area detecting means may detect the area of each luminance level on the basis of a plurality of photographings under different exposure conditions.

In case, moreover, a plurality of luminance regions occupying large areas are detected by the luminance area detecting means, there may be further comprised photographic control means for effecting the photographing of a plurality of shots by adjusting the exposures of the luminance regions to respectively proper signal levels.

In case, on the other hand, the areas of the luminance regions of the proper signal level detected by the luminance area detecting means are smaller than a predetermined value, there may be further comprised photographic control means for effecting the photographing of a plurality of shots by varying the exposure conditions.

By one or a plurality of shots of photographing under the different conditions, the luminance area detecting means inputs luminance signals from the image pickup device to detect the area occupied in the taken frame by each of the luminance regions divided according to the levels.

The exposure control means controls the exposure for photographing such that the luminance regions occupying the large area ratios may take a proper signal level.

Moreover, signals of wide luminance regions can be obtained if the luminance area detecting means is made to detect the areas of the individual luminance regions on the basis of a plurality of shots by varying the exposure conditions.

In case, on the other hand, a plurality of luminance regions occupying large areas are detected by the luminance area detecting means, the photographic control means is further comprised for effecting the photographing of a plurality of shots by adjusting the exposures of the luminance regions to respectively proper signal levels. Then, the photographing is accomplished such that the portions corresponding to the plural luminance regions having large areas are grasped as main objects.

In case, on the other hand, the areas of the luminance regions of the proper signal level detected by the luminance area detecting means are smaller than a predetermined value, photographic control means is further comprised for effecting the photographing of a plurality of shots by varying the exposure conditions. Then, the photographing is accomplished such that the exposure is adjusted to different objects in a plurality of shots.

Other objects and features of the present invention will become apparent from the following description to be made with reference to the accompanying drawings.

BRIEF DESCRIPTION OF THE DRAWINGS

FIG. 1 is a schematic diagram showing the structure of one embodiment of the present invention;

FIGS. 2(A) to 2(E) are time charts showing the states of one example of the operations of the device shown in FIG. 1;

FIGS. 4 to 13 are time charts for explaining the operating states of another embodiment of the present invention;

FIGS. 14(A) to 14(E) are time charts for explaining the behaviors of the bracketing of the prior art;

FIGS. 15(A) to 15(J) and FIGS. 16(A) to 16(J) are time charts showing the states of the operations of the device shown in FIG. 1;

FIG. 17 is a pattern diagram showing an example of a photometric pattern;

FIG. 18 is a schematic diagram showing the structure of another embodiment of the present invention;

FIGS. 19 and 20 are explanatory diagrams for explaining the states of the frame divisions of a photometric element during the photometry;

FIG. 27 is a conceptional diagram showing the assignment of image data on an image memory;

FIG. 33 is a circuit diagram showing the structure of a gate signal generator of the same embodiment;

FIG. 34 is a time chart showing the signal waveforms of the individual portions of the same circuit;

FIG. 35 is a circuit diagram showing the structure of a third embodiment; and

FIG. 36 is a graph presenting the histogram of the luminance region area in the photographing before the bracketing in those embodiments.

DESCRIPTION OF THE PREFERRED EMBODIMENTS

Figure 3:
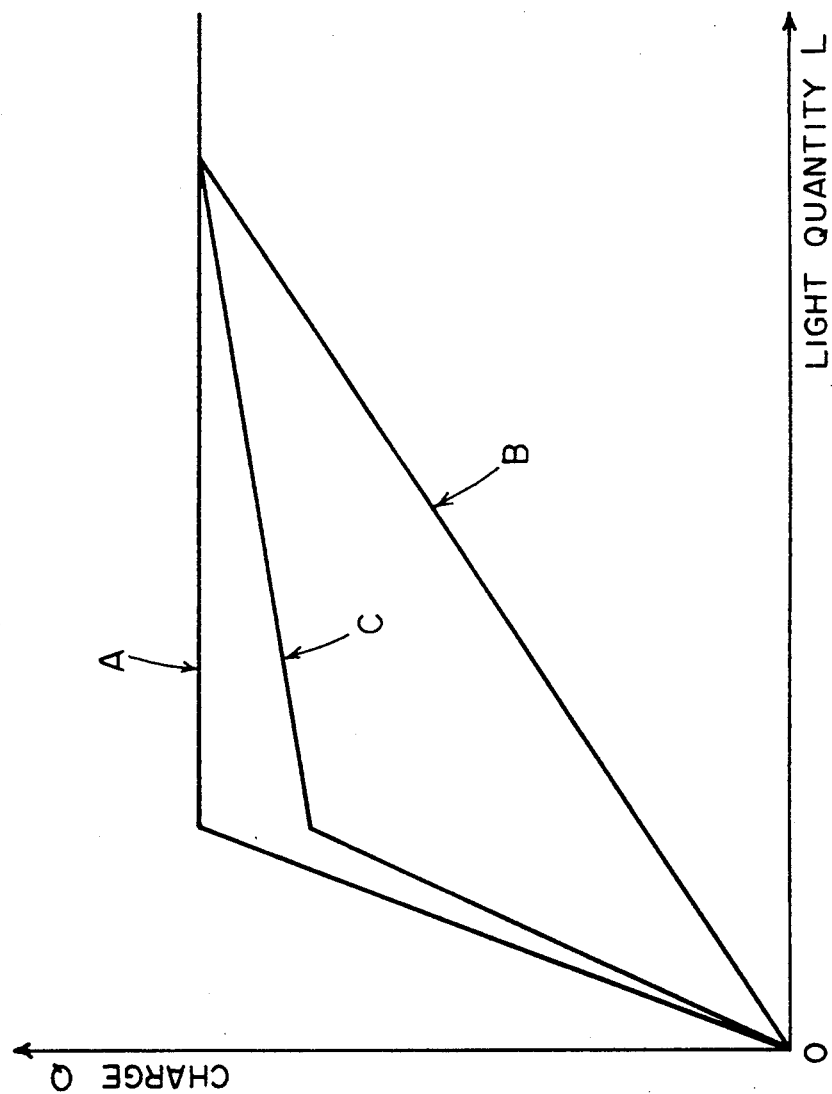
FIG. 3 is an explanatory graph for explaining the case in which images having been subjected to a bracketing photographing are to be composed.

The present invention will be described in detail in the following in connection with the embodiments thereof with reference to the accompanying drawings.

FIG. 1 is a diagram showing the structure of one embodiment of the present invention. In FIG. 1: reference numeral 1 designates a lens system for focusing an image of an object on a CCD; numeral 2 an iris (or iris diaphragm) for restricting the amount of light to pass through the lens system 1; and numeral 3 the CCD for converting the optical image formed by the lens system 1 into electric signals (or image data). Numeral 4 designates an amplifier for amplifying the output of the CCD 3; numeral 5 a processor for converting the output of the CCD 3 into video signals; numeral 6 a recorder for converting the video signals into signals to be recorded in a video floppy; and numeral 7 the video floppy for recording an image. This video floppy 7 is rotationally driven by not-shown drive means. Numeral 8 designates a release switch to be used as a shutter button; numeral 9 a CPU for controlling the exposure and controlling the individual units; and numeral 10 a CCD drive circuit for controlling the CCD 3. The CCD drive circuit 10 is made to have an electronic shutter function to adjust the shutter speed by adjusting the timing for reading out the electric charges. Numeral 11 designates an iris driver for driving the iris 2 in response to the instruction of the CPU 9. Numeral 12 designates a photometric lens for guiding the light of an object into a photometric element 13. Numeral 14 designates an amplifier for amplifying the output of the photometric element 13, and numeral 15 designates an A/D converter for A/D converting the output of the photometric element 13 to feed it to the CPU 9.

FIGS. 2(A)–2(E) are time charts schematically presenting drive pulses which are generated by the CCD drive circuit 10 of the device shown in FIG. 1.

The operations of the device of the present invention will be described in detail in the following with reference to FIGS. 1 and 2. Incidentally, the description referring to FIG. 2 is directed to a case in which an FIT-CCD having a memory for a frame is used.

When the release switch 8 is depressed, the photometry is started. Specifically, the brightness of an object (although not shown) is converted by the photoelectric element 13 into electric signals, which are amplified by the amplifier 14 and are applied as a photometric value to the CPU 9. In this case, the iris and the exposure time are set in conformity to that photometric pattern.

First of all, the CCD 3 is driven in a frame storage mode. A signal of field A is first read out and discarded by a backward transfer (as indicated at ② in FIG. 2(B)). At a suitable time interval, a signal of Field B is then read out and discarded by a backward transfer (as indicated at ② in FIG. 2(C)). Next, the signal of the field B is transferred to the memory unit (as indicated at ③ in FIG. 2(C)), and the signal of the field A is then transferred to the memory unit (as indicated at ④ in FIG. 2(B)). And, the signal of the field B is read out at a video rate and processed by the processor 5 and the recording circuit 6 until it is recorded in the video floppy 7 (as indicated at REC B in FIG. 2(E)). After this, the signal of the field A is likewise read out and processed by the processor 5 and the recorder 6 until it is recorded in the video floppy 7 (as indicated at REC A in FIG. 2(E)).

The exposure timings of the two fields are superposed, if as above, so that their discrepancy raises no problem. However, the object moving at a high speed will be taken in the field A such that it is blurred and in the field B such that it stands still. Thus, the exposure timing can cope with the other ordinary object sufficiently. For example, a portrait can be taken with an absolutely identical look but with different exposures. In case the photographing is taken by the device of the present invention, it is sufficient to select the shot of more proper exposure if care is taken into the photographic timing.

The two images REC A and REC B of FIG. 2(E) are continuously read out as in the ordinary frame recording and are recorded in adjacent tracks. ID signals are not subjected to the frame recording but are two sheets of independent fields. For the frame recording, two images of different exposures are displayed at every 1/60 secs by a reproducer of automatic frame discrimination so that flickers are generated to make the reproductions unclear. If the combination of bracketed images is known, it is convenient to retrieve and process the images by the reproducer. It is, therefore, desirable to indicate, by the use of the user area of the ID signals, that the two images have been bracketed.

Incidentally, the description thus far described is directed only to those portions of the drive pulses for driving the CCD 3, which are necessary for describing the present embodiment. For discarding the unnecessary charges generated at the transfer unit and memory unit of the CCD 3, on the other hand, it is effective even at the pulseless units of FIG. 2 to apply pulses as high as for reading out the video rate to the CCD 3 thereby to run the transfer unit and the memory unit at all times.

FIG. 3 is a graph for explaining the case in which two images of different exposures are to be composed. In FIG. 3, a line A plots the characteristics which are obtained at the field A of FIG. 2(B), so that the portion of high luminance is saturated and blanked white. A line of FIG. 3 plots the characteristics which are obtained at the field 8 of FIG. 2(C), so that the portion of low luminance has its S/N ratio deteriorated and becomes blackish. A line C of FIG. 3 is obtained if those images are so composed on an outside image memory that $A \times \frac{3}{4} + B \times \frac{1}{4}$. As a result, an image of wider dynamic range is obtained with neither the portion of high luminance saturated nor the portion of low luminance having its S/N ratio deteriorated. Incidentally, this composition of the bracketed image of the prior art is not impossible but is limited to a still object. On the contrary, however, the composition can be applied to even a moving object in the present embodiment.

In the aforementioned case of FIG. 2, a double-gap head for the frame recording is used. In case, however, a single-gap head for the field recording is used, there is no problem if the pulses after the recording of the REC B are interrupted and regenerated after the head is moved to a subsequent track, to invite the sequence in which the REC A is recorded.

In FIG. 2, on the other hand, the CCD 3 is driven by the frame storage but may be driven by the field storage so as to improve the sensitivity. In addition to this, the structure of the color filter of the CCD restricts the use to the field drive. In this case, the operations as shown in FIG. 4 are accomplished.

Specifically, all the picture elements are swept off at first, from which the exposure of the field A is started. At the end of the exposure of the field A, all the picture elements are read out and transferred to the memory unit. Immediately after this, the exposure of the field B is accomplished, and all the picture elements are read out and transferred to the memory unit. After this, the fields A and B are read out and recorded in the recited order. In this case, the fields A and B are displaced so that they are out of timing, strictly speaking. Because of the continuous exposures, however, the discrepancy raises no substantial problem so that objects other than that of quick motion are hardly troubled.

FIGS. 5(A)-5(E) are time charts presenting the exposure timings of another embodiment. In case one of two kinds of exposure times exceeds 1/60 secs, the shorter exposure is accomplished earlier whereas the longer exposure is accomplished while the reading and recording of the shorter one are being executed. Then, the time period for the series of sequences is so short that a series of high-speed continuous shots can be advantageously accomplished. Because of no necessity for the memory for the frame, moreover, the ordinary FIT-CCD can be used. In this case, the high-speed transfer after the exposures of the fields A and B of FIG. 5 may be only once.

FIGS. 6(A)-6(E) are time charts presenting the timings in case the ordinary FIT-CCD is used for operations in the frame storage mode. Since the ordinary FIT-CCD has as little as the memory for the field, the signal charges transferred to the transfer unit after the exposure of the field A are not transferred at a high speed but stopped at the transfer unit. When the memory unit is emptied after the reading and recording of the field B, the high-speed transfer is accomplished, and the field A is then read out and recorded. In another method, video rate reading pulses are applied to $\phi V_{11}$ to $\phi V_{14}$ during the period for which the field B is being read out. Since, according to this method, the field A has been transferred to the memory unit when the reading of the field B is finished, no high-speed transfer is required to reduce the current consumption. However, the signal charges slowly move along the light receiving unit exposed to the light, so that the smear is increased.

FIGS. 7(A)-7(D) are time charts presenting the timing in case a inter-line CCD (i.e., IT-CCD) is used. First of all, signal charges of the field A are discarded by the high-speed backward transfer (as indicated at ① in FIG. 7(B)),and charges of the field B are then likewise discarded (as indicated at ② in FIG. 7(C)). And, after lapse of a predetermined time period, the charges of the field B are read out (as indicated at ③ in FIG. 7(C). For this reading period, too, the exposure of the field A continues. After lapse of a predetermined time period, the field A is read out (as indicated at ④ in FIG. 7(B)) and recorded. Depending upon the duration of the exposure time of the field A, the REC A may be more.

Incidentally, the method thus far described has a large smear, and a mechanical shutter may be used together.

FIGS. 8(A)-8(E) are time charts presenting the operation timing in case a mechanical shutter is used for improving the smear. As shown, the shutter is opened for the exposure period (including that of the field B) of the field A but is closed during the reading period (of the REC A and the REC B) so that no smear is established. In this case, in order to elongate the exposure time of the field A, the start timing (for opening the shutter) of the exposure period of the field A is hastened.

In the field storage mode, on the other hand, the operations at the timing shown in FIG. 6 are shown in FIG. 9. Likewise, the operations at the timing shown in FIG. 7 are shown in FIG. 10. In these cases, the exposure timings of the fields A and B are continuous.

Next, the following description is directed to a case in which the bracketing is accomplished by the frame recording. In this case, the timing is not superposed but can be continuous. In the case of the FIT-CCD having the memory of the frame, therefore, the timing is shown in FIG. 11. First of all, specifically, the picture elements of the field A are swept at a high speed by the backward transfer (as indicated at ① FIG. 11(B)), and the picture elements of the field B are then swept at a high speed by the backward transfer (as indicated at ② in FIG. 11(C)). At the end of the first exposure, the fields A and B are sequentially read out (as indicated at ③ and ④, in FIGS. 11(B) and 11(C)) and transferred at a high speed to the memory unit until they are recorded in the same order in response to $V_{SYNC}$ (as indicated at ⑤ and ⑥ in FIG. 11(E)). This the recording of the first image, corresponding to the period beginning at 1-A, and ending at 1-B. At the end of the recording of the 1-B, the fields A and B are read out in the recited order (as indicated at ⑦ and 10 in FIGS. 11(B) and 11(C)) and are transferred at a high speed to the memory unit. A still video recording device enabled to accomplish the frame recording can have its two tracks continuously recorded because of its double-gap head but cannot have any recording without moving the head. Therefore, the fields A and B are recorded after the time period of the head movement (as indicated at ⑨ and ①⓪ in FIG. 11(E)). This is the recording of the second image, as indicated at 2-A and 2-B. As is apparent from FIG. 11, the exposure time periods of the 2-A and 2-B are 1/30 secs or longer. If, however, the 2-A and 2-8 are subjected to not the frame recording but the field recording, the exposure time can be arbitrarily set. Specifically, the signal charges may be transferred at an arbitrary timing to the transfer unit and latched thereat until they are transferred at a high speed to the memory unit at the end of the REC of the 1-B. In the case of the composition, as shown in FIG. 3, the field A can be used by elongating the exposure time periods of the 1-A and 1-B of FIGS. 11(B) and 11(C) because it is the main image, and the field B is used by elongating the exposure time periods of the 2-A and 2-B. Since, moreover, the portion B is used for correcting the portion A saturated and blanked white, there are many applications such as the frame for A and the field for B.

FIGS. 12(A)-12(E) are time charts presenting the timing of the bracketing in case the FIT-CCD is used. The differences from FIG. 11 are that the signals of the 1-B are latched in the transfer unit during the 1-A REC and that the 2-A is in the memory unit whereas the 2-B is in the transfer unit while the head feed is being awaited.

Although the description thus far made is directed to the bracketing for photographing two images, the bracketing of three images can be accomplished, as will be described in the following.

FIGS. 13(A)-13(D) are time charts presenting the timing in case three images are bracketed by the FIT-CCD.

After the backward transfer and sweep of the field A (as indicated at ①in FIG. 13(B)), the backward transfer and sweep of the field B (as indicated at ② in FIG. 13(C)), and the read-out of the field A (as indicated at ③ in FIG. 13(B)), the $V_{SYNC}$ (as indicated at ④ in FIG. 13(A)) is awaited to record (as indicated at A REC) of the field A (as indicated at ⑤ in FIG. 13(D)). After the read-out (as indicated at ⑥ in FIG. 13(C)) of the field B, the field 8 is recorded (as indicated at B REC) (as indicated at ⑦ in FIG. 13(D)). After the readout (as indicated at ⑧ in FIG. 13(B)) of a field C in which the storage is started simultaneously with the read-out (as indicated at ③ in FIG. 13(B)) of the field A is accomplished, the $V_{SYNC}$ (as indicated at ⑨ in FIG. 13(A)) is awaited to record (as indicated at C REC) the field C (as indicated at 10 in FIG. 13(D)). In case, however, the head feed takes a long time between the B REC and the C REC, a time interval is interposed between the exposure end ⑧ and the REC 11 . Since the individual exposure periods of the fields A, B and C are superposed or continued, as shown, it is possible to accomplish the bracketing without any timing discrepancy.

Although the field C is restricted to 1/30 secs or longer in the bracketing case shown in FIG. 13, the ordinary FIT CCD is 1/60 secs or longer, and the FIT-CCD having a memory for the frame is an arbitrary time period. In this bracketing case, it frequently occurs that the image of proper exposure is limited to only one whereas the other images are unnecessary. If these unnecessary images are erased in this case, the result is that vacant tracks exist discretely on the disc. If this disc is inserted again into the camera for the bracketing, the recording operations cannot be continuously accomplished to raise disadvantages. In other words, the operations are as shown in FIGS. 9 and 11 to 13 in the cases of FIGS. 2, 4 to 8 and 10. Moreover, the time interval is elongated in the cases shown in FIGS. 9 and 11 to 13. If this time interval is so long, the CPU 9 may anticipate this to issue a warning or to inhibit the bracketing. In normal cases, however, there arises no problem.

Incidentally, the embodiments thus far described are directed to the case in which the recording medium is exemplified by the video floppy, but should not be limited thereto. Especially in case the medium is exemplified by a semiconductor memory, no head feed is required to establish a standby time even in the case of recording three frames.

As has been described hereinbefore, according to the present invention, the sweeping and reading operations of two fields to be exposed by the image pickup device are controlled independently of each other in the individual fields so that the exposures of different time periods are accomplished at superposed or continuous timings. As a result, it is possible to realize an electronic still camera which can accomplish the auto-bracketing at the simultaneous or superposed timings.

FIGS. 15(A) to 15(J) and FIGS. 16(A) to 16(J) are time charts schematically presenting the remaining operations of the device shown in FIG. 1.

The operations will be described in detail in the following.

When the release switch 8 is depressed, the photometry is started. Specifically, the brightness of the object (although not shown) is converted by the photometric element 13 into electric signals, which are amplified by the amplifier 14 and are then applied as the photometric value to the CPU 9. Let the case be considered, in which the pattern of the photometric element 13 is identical to that shown in FIG. 19 and in which there is no difference between the upper three portions (a, b and c) and the central portion (e). In this case, the object is decided to be in the normal state from the photometric pattern, and the iris and exposure time ($T_1$) are accordingly set to execute the exposure. After the end of the exposure, moreover, the image is read out from the memory unit of the CCD 3 and recorded in the video floppy 7.

Next, the case of the backlight is considered in the following. In the photometric pattern at the photometric element 13, there is a large difference between the upper three portions (a, b and c) and the central portion (e), and this central portion has a low luminance (as shown in FIGS. 16(B) and 16(C)). From this photometric pattern, the CPU decides that the state is in the backlight. At this time, the signals of one field of the CCD 3 are swept by a high-speed backward transfer (as indicated at ① in FIG. 16(F)), and the signals of the other field are swept after a suitable time by a high-speed backward transfer (as indicated at ② in FIG. 16(G)). After a $T_1$ time from the first sweep, the signals of the field are read out (as indicated at ③ in FIG. 16(F)) and are transferred at a high speed to the memory unit. At the exposure time $T_1$, the exposure is adjusted to the object of low luminance. After a time $T_2$ from the subsequent sweep, the signals of the field are then read out (as indicated at ④ in FIG. 16(G)) and are latched in the transfer unit. At the exposure time $T_2$, the exposure is adjusted to the object of high luminance. Then, the signals having been transferred to the memory unit of the CCD 3 are read out (as indicated at ⑤ in FIG. 16(I)) and are processed by the processor 5 and the recorder 6 until they are recorded in the video floppy 7. After the end of the recording, the signals latched in the transfer unit are transferred by a high-speed transfer to the memory unit (as indicated at ⑥ in FIG. 16) and read out (as indicated at ⑦ in FIG. 16(I)) and are processed by the processor 5 and the recorder 6 until they are recorded in the video floppy 7.

For the object in the ordinary state, as described above, only one shot is recorded to prevent the waste use of the recording capacity. For the object having a large luminance difference, on the other hand, both an image having its exposure adjusted to the high luminance side and an image having its exposure adjusted to a low luminance side are simultaneously taken and are recorded. This results in no failure due to the exposure mistake even for a large luminance difference. Moreover, the photographer may select a preferable one from the taken images. This procedure is convenient for obtaining a composed image by the image processing.

Incidentally, the photometric element 13 may be divided by any number other than nine, and the area division pattern may be any other than the aforementioned one. For example, the photometric element to be frequently used in a relatively inexpensive single-lens reflex camera is exemplified in FIG. 17. This use is considerably effective even for the photographing in which the exposure controls are accomplished in conformity to the central and peripheral portions when there is a large difference between the central signal output (A) and the peripheral signal output (B).

Moreover, it is not always necessary to use the photometric element. In other words, the output taken by the CCD 3 can be used for judging the backlight.

FIG. 18 is a diagram showing the structure in case the photometry is to be accomplished by the CCD 3. The units identical to those of FIG. 1 are designated at the common reference numerals, and their detailed descriptions will be omitted. In FIG. 18, reference numeral 16 designates a photometric circuit for calculating a photometric value for exposure controls from the output of the CCD 3. Moreover, the photometric lens 12 to the A/D converter 15 existing in FIG. 1 are omitted. Thus, the output of the CCD 3 is processed by the photometric circuit 16, and the result is transmitted to the CPU 9. In this case, the exposing and reading operations are repeated several times before the actual exposure and recording. And, the image pickup and recording are accomplished like the aforementioned case.

If, in the aforementioned embodiment, it is necessary to await the rise of the rotations of the drive motor of the video floppy 7, the exposure and recording are accomplished after awaiting a necessary time from the depression of the release switch 8.

Incidentally, in the time chart of FIG. 16, the longer exposure (as indicated at $T_1$ in FIG. 16(F)) is started and ended previously whereas the shorter exposure (as indicated at $T_2$ in FIG. 16(G)) is started and ended later, but the order may be inverted. Specifically, what luminance distribution the main object resides in is decided from the luminance pattern of the object so that the exposure and recording of the first shot are accomplished in conformity to the luminance region. The exposure and recording conforming to the other luminance regions are accomplished on and after the second shot. If the release switch is OFF before the start of the exposure or recording on or after the second shot, the recording on or after the second shot is not accomplished. Thus, the user himself can conveniently control whether or not the bracketing is to be done. In case, on the other hand, the recording on or after the second shot has to await the head feed (or in case the empty tracks using the single head are discrete), the second or later image has its S/N ratio deteriorated, but few problems arise because the main image has been previously recorded.

Moreover, the number of shots should not be limited to the two. By using the photometric element shown in FIG. 17, for example, it is conceivable to make four shots of only the output of the central element, only the outputs of the peripheral elements, the stressing of the central using the former two, and the stressing the periphery using the former two. In an extreme case, it is conceivable to make nine shots according to the outputs of the individual elements by using the nine-divided photometric elements and more shots according to the combination of the former. In this case, however, it is anticipated that the number of shots becomes excessive. In most cases, several ones of the divided nine elements may output the outputs identical to that of another element. Thus, a plurality of shots need not be made for the same exposure so that its number is not increased so much but is frequently confined within a practical range.

Incidentally, in case the number of shots is three or more, a more or less time lag is established between the exposure times of the first and second shots and third or later shot.

Moreover, the CCD to be used can be exemplified by one other than the FIT-CCD. In the case of the interline CCD or frame transfer CCD, the time lag also arises in the exposures of the first and second shots to raise the problem of the smear. However, the function of the present invention can be fundamentally realized. Like realization can be achieved even in case a mechanical shutter is used. In this case, the smear can be prevented, but the mechanical shutter has to be operated repeatedly at a high speed to require a mechanism of high precision and reliability.

As has been described in detail hereinbefore, according to the embodiment of the present invention, the exposure is accomplished in conformity to a specific luminance and another luminance, when the luminance difference of the object is large, to record the two images. As a result, it is possible to realize an electronic still camera which is enabled to record images in excellent exposure irrespective of the luminance distribution pattern of the frame.

Still another embodiment of the present invention will be described in detail in the following.

Figure 21:
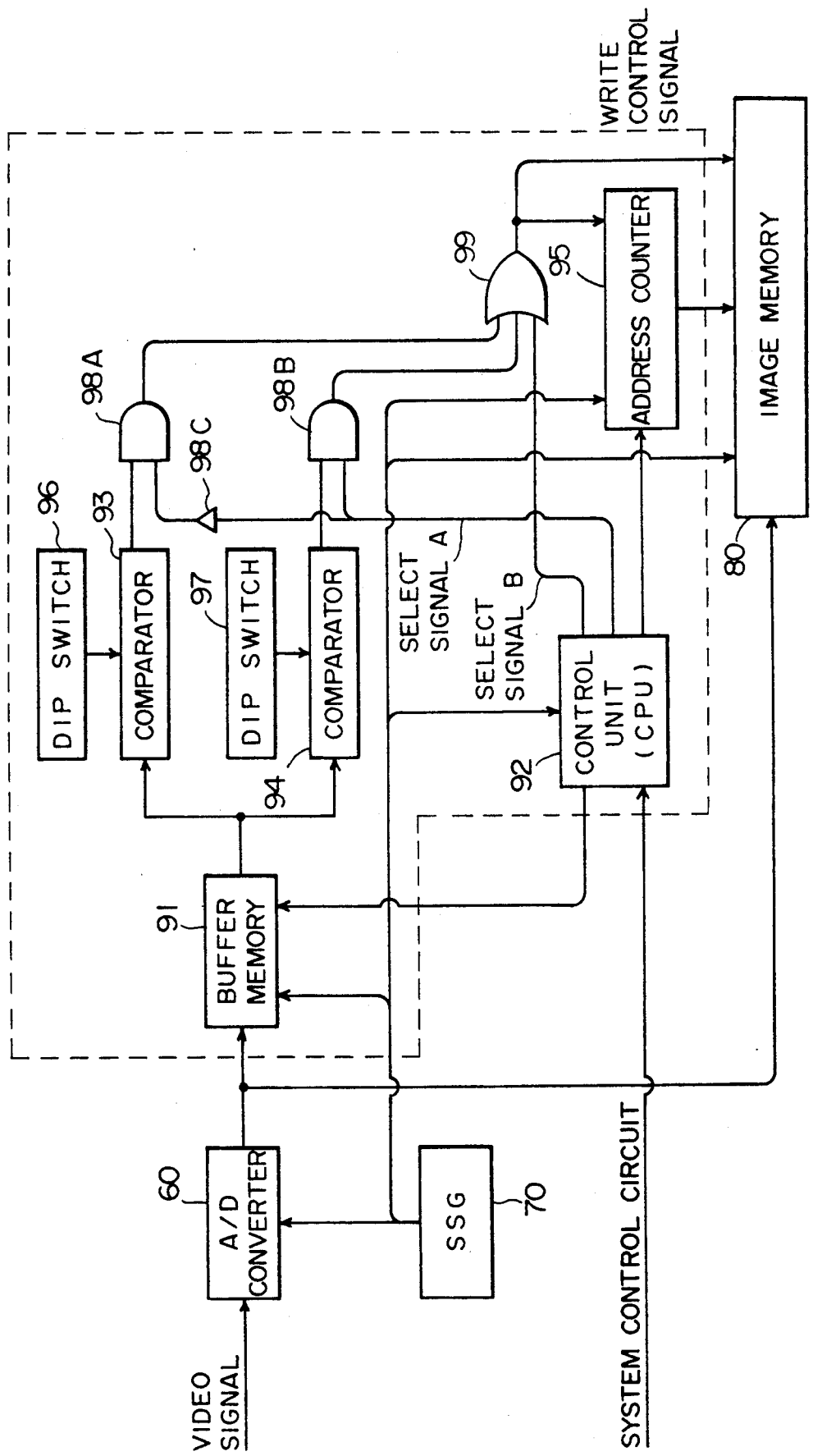
FIG. 21 is a block diagram showing the recording unit of an electronic still camera of the present invention.

FIG. 21 is a block diagram showing an embodiment of the electronic still camera according to the present invention, namely, the schematic structure of the recording unit of the electronic still camera.

The electronic still camera of the present embodiment is constructed of an A/D converter 60, a synchronizing signal generator 70, a buffer memory 91, a control unit 92, comparators 93 and 94, DIP switches 96 and 97, an address counter 95, AND circuits 98A and 98B, a NOT circuit 98C and an OR circuit 99.

The A/D converter 60 A/D-converts video signals and sends out digital video signals to an image memory 80 and the buffer memory 91.

The synchronizing signal generator 70 (which will be shortly referred to as the "SSG") sends out a clock signal or a reference of the system to the A/D converter 60, the buffer memory 91, the control unit 92, the address counter 95 and the image memory 80.

The buffer memory 91 has a storage capacity capable of horizontally scanned video signals of 262.5 lines, for example, which compose a still image of one frame. The buffer memory 91 stores the digital video signals in response to a write instruction signal from the control unit 92 and reads them out in response to a read instruction signal from the control unit 92.

The DIP switch 96 selects and sets threshold values corresponding to those high-luminance components of the video signals, which are blanked white. These threshold values SH are set in plurality and can be selectively set to an arbitrary value. The comparator 93 compares the video signals sent out from the buffer memory 91 and the threshold values SH set by the DIP switch 96 to send out an output High only when the video signals exceed the threshold values SH. The DIP switch 96 and the comparator 93 correspond to high-luminance discriminating means.

The DIP switch 97 selects and sets threshold values SL corresponding to the low-luminance components of the video signals, which are blanked black. The threshold values SL are set in plurality to select and set an arbitrary set value. The comparator 94 compares the video signals sent out from the buffer memory 91 and the threshold values SL set by the DIP switch 97 to send out an output High only when the video signals are lower than the threshold values SL. The DIP switch 97 and the comparator 94 correspond to low-luminance discriminating means.

In the present embodiment, the selecting means is constructed of the AND circuits 98A and 98B, the OR circuit 99 and the NOT circuit 98C. This selecting means determines the write instruction signal and the address signal in response to a select signal A and a select signal B coming from the control unit 92. The AND circuit 98A has its one input terminal fed with the output signal of the comparator 93 and its other terminal fed with the select signal A of the control unit 92 to take an AND between the two signals. The AND circuit 98B has its one input terminal fed with the output signal of the comparator 94 and its other input terminal fed with the select signal A of the control unit 92 to take an AND between the two signals. The OR circuit 99 takes an OR among the output signal of the AND circuit 98A, the output signal of the AND circuit 98B and the select signal B of the control unit 92 to send out its output signal to the address counter 95 and the image memory 80. Here, the output signal to be sent out to the image memory 80 is a write control signal, and an output signal to be sent out to the address counter 95 allows the counting of the address values.

The address counter 95 sends out to the image memory 80 an address signal for designating the address values of the image data to be stored in the image memory 80. In the address counter 95, the address values are incremented in response to the clock coming from the SSG while the output signal of the OR circuit 99 is High. Incidentally, the address values may be decremented depending upon the structure of the memory.

The control unit 92 sends out the select signal A and the select signal B for selecting the image data of the low-luminance video signals or the high-luminance video signals. The control circuit 92 sends out a reset signal to the address counter 95. Moreover, the control circuit 92 sends out the write instruction signal and the read instruction signal to the buffer memory 91.

Figure 22:
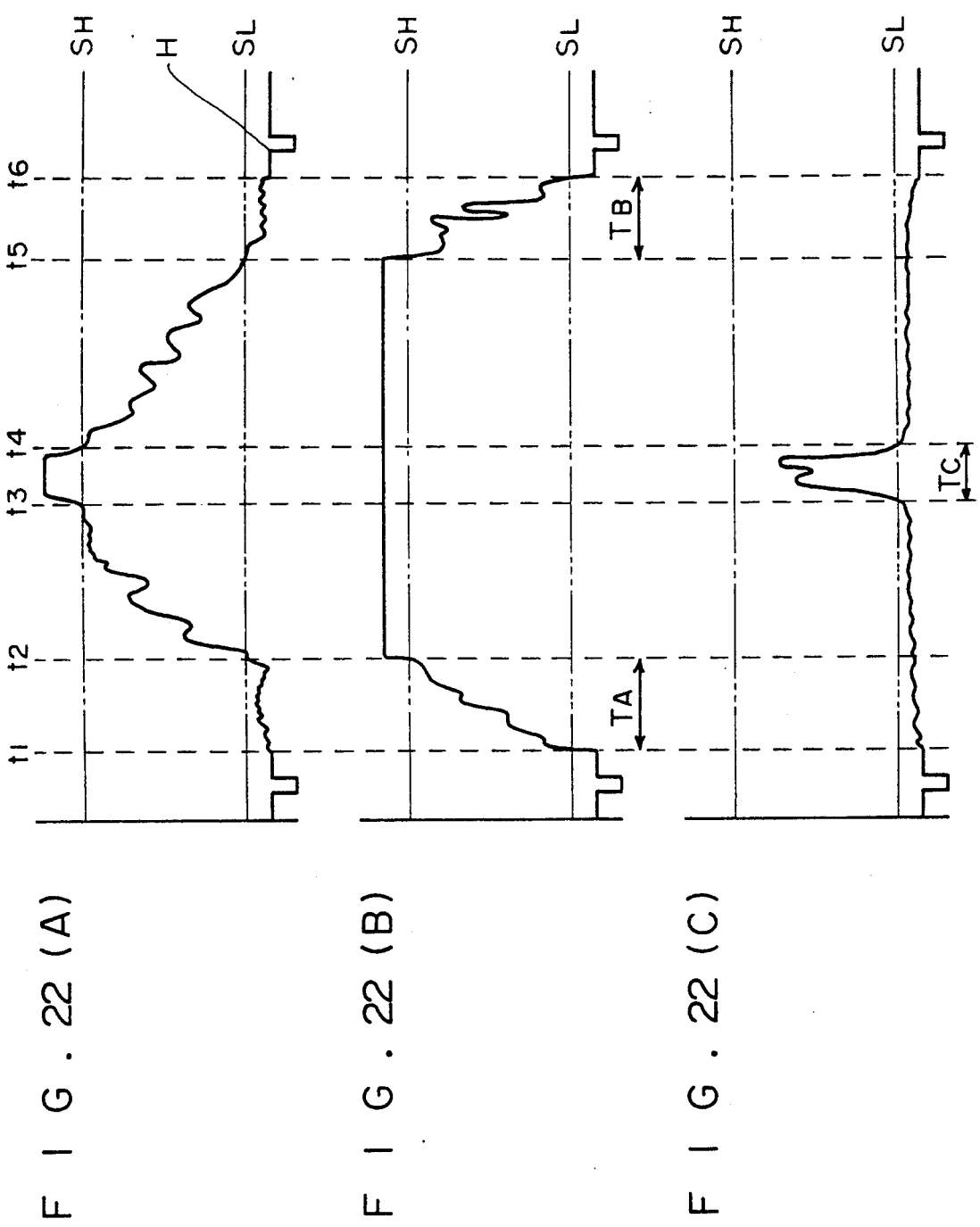
FIG. 22(A) is a graph presenting the video signals of one scanning line during photographing under the standard photographic conditions.
FIG. 22(B) is a graph presenting the video signals of one scanning line during photographing under the low-luminance stressed photographic conditions.
FIG. 22(C) is a graph presenting the video signals of one scanning line during photographing under the high-luminance stressed photographic conditions.

FIGS. 22(A) to 22(C) are graphs presenting those video signals of one scanning line in the image frame, which are bracketed under three kinds of photographic conditions. Here, each of the video signals of one scanning line its interposed at its two ends by the clocks of a horizontal synchronizing signal so that none of them is superposed on the leading and trailing ends of the clock for a constant period.

FIG. 22(A) is a graph presenting the video signal of one scanning line under the standard photographic conditions. Here, the video signal is below the threshold value SL for the time periods of $t_1$ to $t_2$ and $t_5$ to $t_6$ so that the image is blanked black in those time regions. For the time period of $t_3$ to $t_4$, on the other hand, the video signal is over the threshold value SH so that the image is blanked white in that time region. There is presented in FIG. 22(B) a graph presenting that video signal of the image frame, which is bracketed under the photographic condition stressing the low luminance. This video signal has its black-blanked region of the time period of $t_1$ to $t_2$ falling between the threshold values SH and SL. Moreover, the graph showing that video signal of one scanning line, which is taken under the photographic condition stressing the high luminance, is presented in FIG. 22(C). Here, the white-blanked region of the time period of $t_3$ to $t_4$ falls between the threshold values SH and SL.

Next, the bracketing operations of the electronic still camera of the present embodiment will be described in the following.

After lapse of about 1/60 secs from the depression of a release (although not shown), a system control circuit (although not shown) releases the shutter in accordance with preset shutter speeds and F-number. As a result, the reflected light from the object is condensed by the camera lens and focused by the photodiode of the light receiving unit of the CCD so that electric charges are generated in accordance with the intensity of the light by the photoelectric converting actions. The image signals of one frame stored at the individual picture elements of the CCD are sequentially transferred to a signal processor (although not shown) on the basis of the clock frequency of the clock pulses. In the signal processor, the image signals are processed to produce the video signals. Incidentally, the shutter should not be limited to the mechanical one but may be exemplified by an electronic shutter.

Now, the video signals taken under the standard photographic condition shown in FIG. 22(A) are sent out to the A/D converter 60. In this A/D converter 60, the video signals are subjected to an A/D conversion for the time period of the clock signals coming from the SSG 70 and are sent out to the buffer memory 91 and the image memory 80. At this time, the control unit 92 sends out the write instruction signal to the buffer memory 91. In this buffer memory 91, the video signals are written in on the basis of the clock signals coming from the SSG 70. Thus, the video signals of one frame are written.

On the other hand, the control unit 92 sends out the signal at the High level to the OR circuit 99. As a result, the write control signal sent out from the OR circuit 99 to the image memory 80 instructs the writing operation. In the address counter 95, moreover, the address values are incremented in response to the clock signals sent out from the SSG 70 so that the address signals having the incremented address values are sent out to the image memory 80.

In this image memory 80, the video signals having been subjected to the A/D conversion are sent out on the basis of the clock signals of the SSG 70 so that the video signals are sequentially stored at the addresses indicated by the address signals of the address counter 95. Thus, the video signals of one frame taken under the standard photographic condition are written in the image memory 80. Next, the video signals of the image frame taken under the photographic condition stressing the low luminance, as shown in FIG. 22(B), are sent out to the A/D converter 60. In this A/D converter 60, the video signals are subjected to the A/D conversion for the time period of the clock signals of the SSG 70 and sent out to the image memory 80. Incidentally, at this time, the A/D converter 60 also sends out the video signals to the buffer memory 91, but the buffer memory 91 does not write in the video signals because no write instruction signal is sent out from the control unit 92.

This control unit 92 sends out the read instruction signal to the buffer memory 91 in response to the instruction signal of the system control circuit. In the buffer memory 91, the video signals taken under the aforementioned photographic condition are read out on the basis of the clock signals of the SSG 70 and are sent out to the comparators 93 and 94.

In the former comparator 93, a comparison is accomplished between the video signals sent out from the buffer memory 91 and the threshold value SH set by the DIP switch 96 so that the signal at the High level is outputted only when the threshold value SH is exceeded. In the latter comparator 94, on the other hand, a comparison is accomplished between the video signals sent out from the buffer memory 91 and the threshold value SL set by the DIP switch 97 so that the signal at the High level is sent out only when the threshold value SL is not exceeded.

At this time, the control unit 92 sends out the signal at the Low level to the OR circuit 99. The AND circuit 98B has its one input terminal fed with the signal at the High level whereas the AND circuit 98A has its one input terminal fed with the signal at the Low level, which has been inverted by the NOT circuit 98C. The output signal coming from the AND circuit 98A is always at the Low level, and the output signal coming from the AND circuit 98B is the output signal coming from the comparator 94. Since, moreover, the signal at the Low level is sent out from the control unit 92 to the OR circuit 99, the output signal coming from the OR circuit 99 is the output signal coming from the AND circuit 98B. This output signal is sent out as the write control signal to the image memory 80 and further to the address counter 95 from the OR circuit 99. In other words, only for the time periods of $t_1$ to $t_2$ and $t_5$ to $t_6$, the address counter 95 counts the clock signals coming from the SSG 70, and the write control signal instructs the writing operation. In the image memory 80, therefore, the video signals are written in on the basis of both the address signals coming from the address counter 95 and the write control signal coming from the OR circuit 99. In other words, the video signals of the time periods of $t_1$ to $t_2$ and $t_5$ to $t_6$ are written in the image memory 80, but not the video signals of other time periods. The aforementioned processing operations are accomplished for the horizontal scanning lines, e.g., 262.5 lines for forming the image of one frame. Thus, the storage capacity of the video signals can be spared.

Moreover, the video signals of the picture frame, which are taken under the photographic condition stressing the high luminance, as shown in FIG. 22(C), are sent out to the A/D converter 60. In this A/D converter 60, the video signals are subjected to an A/D conversion for the time period of the clock signals of the SSG 70 so that the digital video signals are sent to the image memory 80. At this time, the A/D converter 60 further sends out the video signals to the buffer memory 91, which does not write the video signals because it receives none of the write instruction signal.

The control unit 92 sends out the read instruction signal to the buffer memory 91 in response to the instruction signal coming from the system control circuit. In the buffer memory 91, the video signals taken under the aforementioned standard photographic condition are read out on the basis of the clock signals of the SSG 70 and are sent out to the comparator 93 and the comparator 94.

In the comparator 93, a comparison is accomplished between the video signals sent out from the buffer memory 91 and the threshold value SH set by the DIP switch 96 so that the signal at the level High is outputted only when the video signals exceed the threshold value SH. In the comparator 94, on the other hand, a comparison is accomplished between the video signals sent out from the buffer memory 91 and the threshold valve SL set by the DIP switch 97 so that the signal at the level High is sent out only when the video signals do not exceed the threshold value SL.

At this time, the control unit 92 sends out the select signal at the Low level to the OR circuit 99.

The AND circuit 98B has its one input terminal fed with the signal at the Low level, whereas the AND circuit 98A has its one input terminal fed with the signal at the High level, which has been inverted by the NOT circuit 98C. The output signal coming from the AND circuit 98A is the output signal coming from the comparator 93, whereas the output signal coming from the AND circuit 98B is always at the Low level. Since, moreover, the signal at the Low level coming from the control unit 92 is sent out to the OR circuit 99, the output signal coming from the OR circuit 99 is the output signal coming from the AND circuit 98A. This output signal is sent out as the write control signal from the OR circuit 99 to the image memory 80 and further to the address counter 95. Only for the time period of $t_3$ to $t_4$, specifically, the address counter 95 counts the clock signals of the SSG 70 so that the write control signal instructs the writing operation. Then, the image memory 80 writes in the video signals on the basis of both the address signals coming from the address counter 95 and the write control signals coming from the OR circuit 99. In short, the video signals of the time period $t_3$ to $t_4$ are written in the image memory 80, but not the video signals of the other time periods. The aforementioned processing operations are accomplished for the horizontal scanning lines, e.g., 262.5 lines for forming the image of one frame. Thus, the storage capacity of the video signals can be spared. As a result, the electronic still camera of the present embodiment can use the storage medium efficiently when it is to accomplish the bracketing.

Incidentally, the picture frame to be taken under the standard photographic condition may omit the high-luminance video signals for white-blanking and the low-luminance video signals for black-blanking from its component video signals (as shown in FIG. 22(A), for example). Here, the position informations in the picture frame for the white- and black-blankings have to be stored.

Figure 23:
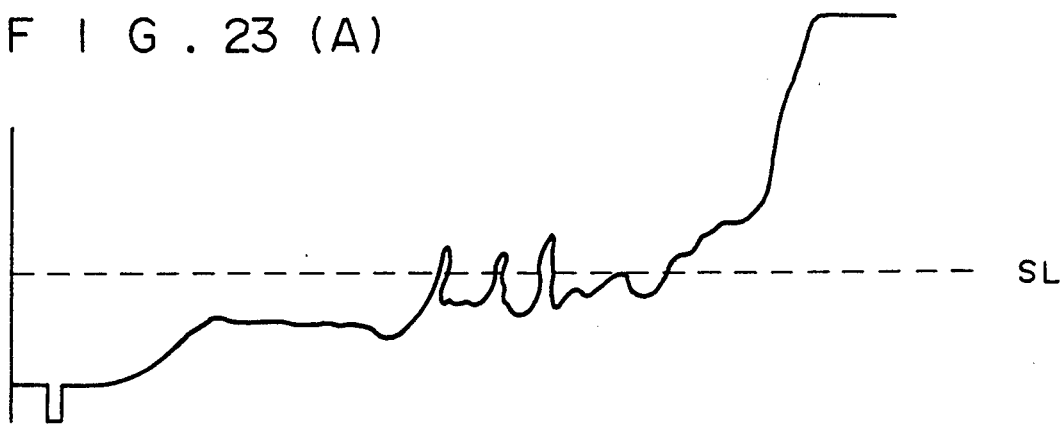
FIG. 23(A) is a graph presenting the enlarged video signal under the low-luminance stressed photographic conditions.
FIG. 23(B) is a graph presenting the video signal after it has been passed through a low-pass filter.
Figure 23:
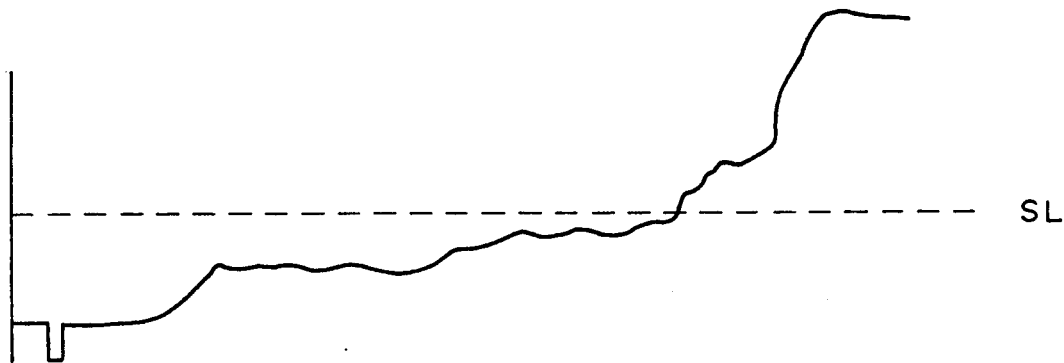
Figure 24:
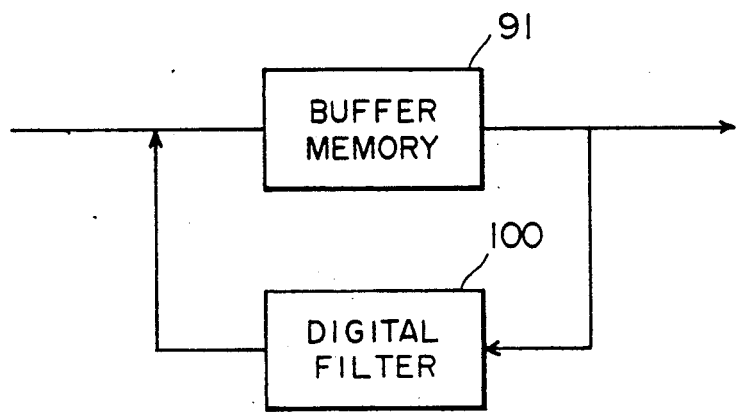
FIG. 24 is a block diagram showing the connection between a buffer memory and a digital filter.

FIG. 23(A) is a graph presenting the video signal under the photographic condition stressing the low luminance. In the video signal, as shown, the portions over and below the threshold value SH are caused by the high-frequency components to appear for a short time period. With this video signal recording, false color signals or false edges are liable to occur when the image is to be composed later. In order to prevent this, it is recommendable to provide a low-pass filter. As shown in FIG. 24, for example, a digital filter 100 may be connected as the low-pass filter in the feedback form to the buffer memory 91. FIG. 23(B) is a graph presenting the video signal which has been passed through the low-pass filter. This video signal is one which has its high-frequency components filtered out.

Figure 25:
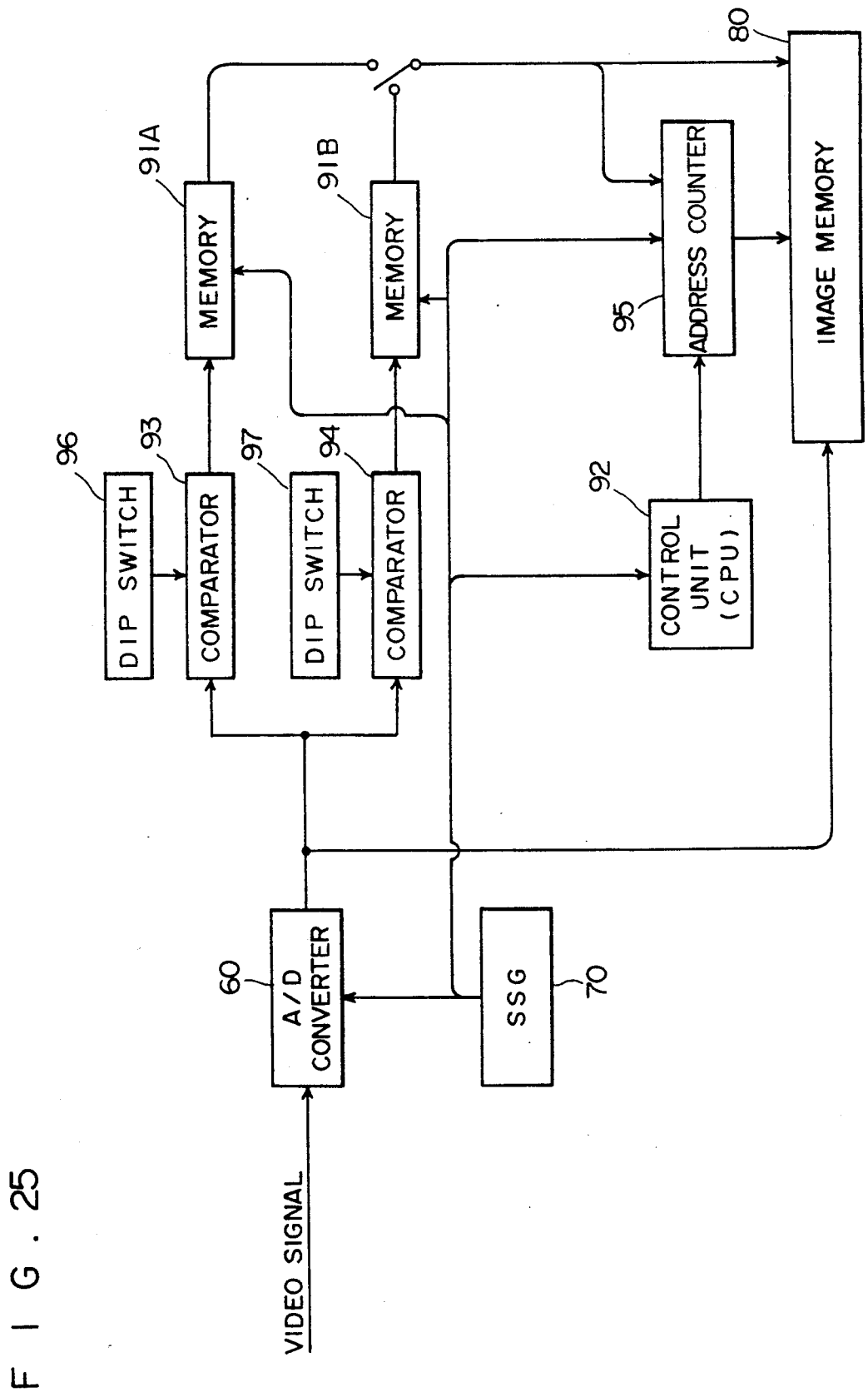
FIGS. 25 and 26 are block diagrams showing two other embodiments of the recording unit of the electronic still camera of the present invention.

Another example conceivable is shown in FIG. 25. This embodiment is different from that shown in FIG. 21 in that the buffer memory 91 is replaced by memories 91A and 91B at the output side of the comparators 93 and 94. These memories 91A and 91B may have a capacity of the number of picture elements ×1 bit because they store only the outputs of the comparators. Thanks to these two memories, the storage capacity is reduced to the number of picture elements ×2, which value is about as low as ¼ of the number of picture elements x (the bit number of the AD) of the buffer memory.

In operations for recording one picture, the comparators 93 and 94 are also operated to store the regions, in which the levels of the video signals are over and below a certain threshold value, in the form of binary signals in the memories 91A and 91B. Second and third pictures are recorded only if one of the memories is driven to give an output at 1 (or 0, when the polarities of the comparators are inverted).

Figure 26:
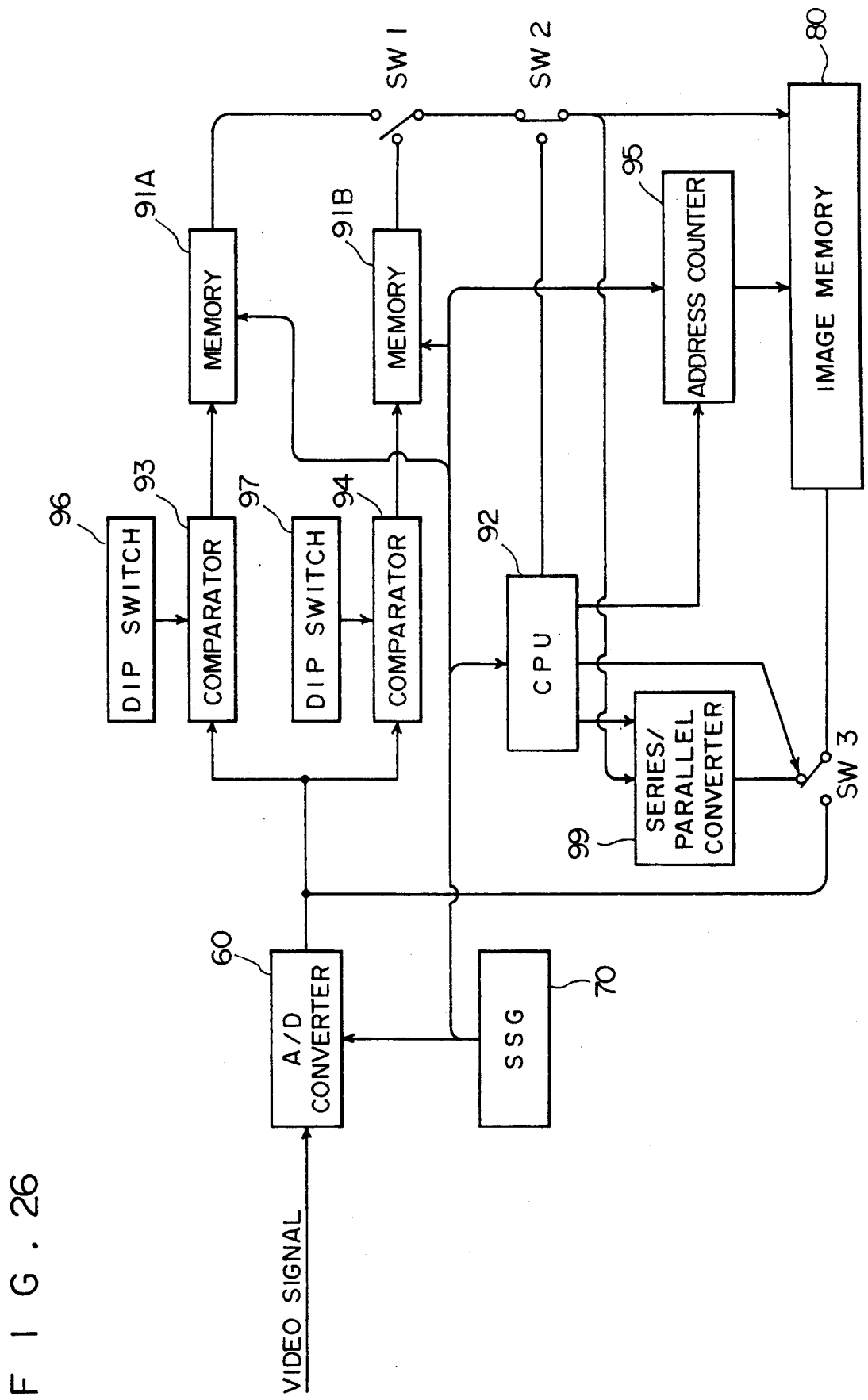

There is still another embodiment, as shown in FIG. 26. According to this structure, a first image is subjected to the A/D converter 60 and is recorded as it is in the image memory. Simultaneously with this, the comparator is operated to store its result in the memories 91A and 91B. When a second image is to be recorded, the address counter 95 is returned to the initial value which is taken when the first image is recorded, so that the second image is recorded only when the memory 91A takes the value 1. For a third image, the address counter 95 is likewise initialized so that the third image is recorded only when the memory 91A takes the value 1. Next, the values of the memories 91A and 91B are subjected to a series/parallel conversion (in which each bit of serial signals is converted into a parallel signal of 8 bits) and are recorded in the image memory 80. As a result, the data in the image memory 80 are shown in FIG. 27. According to this method, the white- and black-blanked portions of the image data of the first image are deleted, and the data of the second and third images are recorded. And, the data of the memories 91A and 91B are recorded in the image memory 80 so as to discriminate later which portions of the image memories belong to the data of the first image or the data of the second and third images. According to this method, any image can be recorded with the storage capacity of 1.25 sheets.

If an object having a large luminance difference is taken, there still remain the black- and white-blanked portions even after three images have been taken. In this case, the following operations are accomplished by making use of the structure of FIG. 25 or 26. For the photography of the second image, the writing operation from the memory 91A to the image memory is controlled, and the comparator is also operated to rewrite the memory 91A with its result. Like operations are also applied to the third image.

Next, over (or under) the exposure condition, a fourth image is taken, and the writing operation in the image memory is controlled depending upon the value of the memory 91A. Like operations are also applied to a fifth image. If, for the fourth and fifth images, the comparator is operated like the second and third images to rewrite the memories 91A and 91B, the operations can be continued to sixth and seventh images. If these operations are repeated, the black- and white-blanked portions can be completely eliminated. In the case of FIG. 26, the contents of the memories 91A and 91B have to be recorded in the image memory each time their contents are changed.

As has been described hereinbefore, the electronic still camera according to the above-specified embodiment of the present invention can accomplish the bracketing while suppressing the consumption of the memory capacity.

Figure 28:
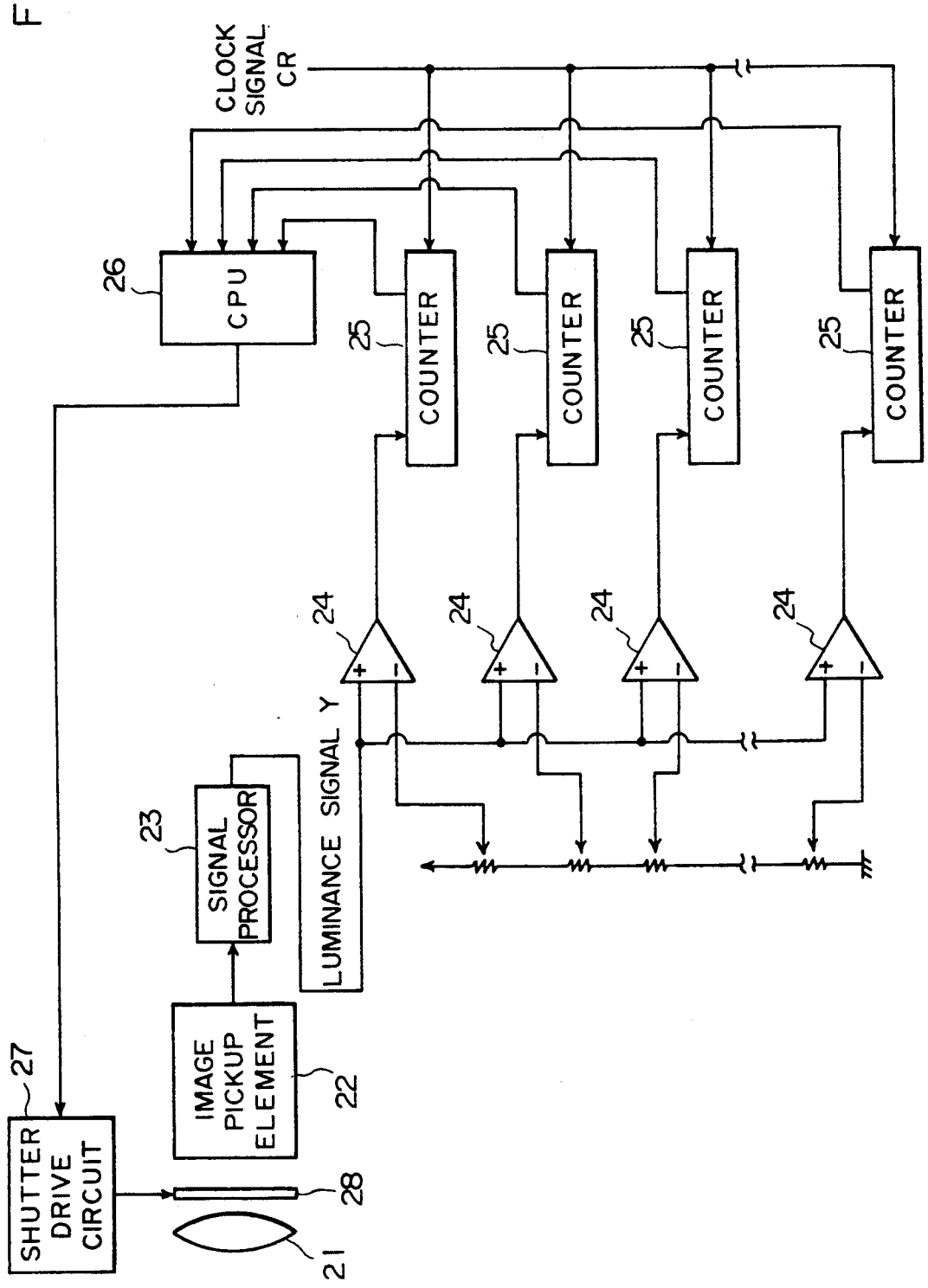
FIG. 28 is a circuit diagram showing the structure of one embodiment of the camera exposure control apparatus according to the present invention.

FIG. 28 shows one embodiment of a camera exposure control device according to the present invention. In FIG. 28, a light coming from a lens 21 of a camera (which may be either an electronic still camera or a silver halide film type camera) is photoelectrically converted by an image pickup element 22 so that a luminance signal Y is separated and extracted by a signal processor 23.

A circuit for detecting areas of the photographic frame, which are occupied by a plurality of individual luminance regions divided, from the aforementioned luminance signal Y is constructed, as follows.

Specifically, the luminance signal Y is inputted to the plus terminals of comparators 24 which are provided in the number equal to that of the aforementioned luminance regions. The minus terminals of the comparators 24 are sequentially fed with those signal levels corresponding to the luminance regions, which are divided from a reference voltage by resistors.

Figure 29:
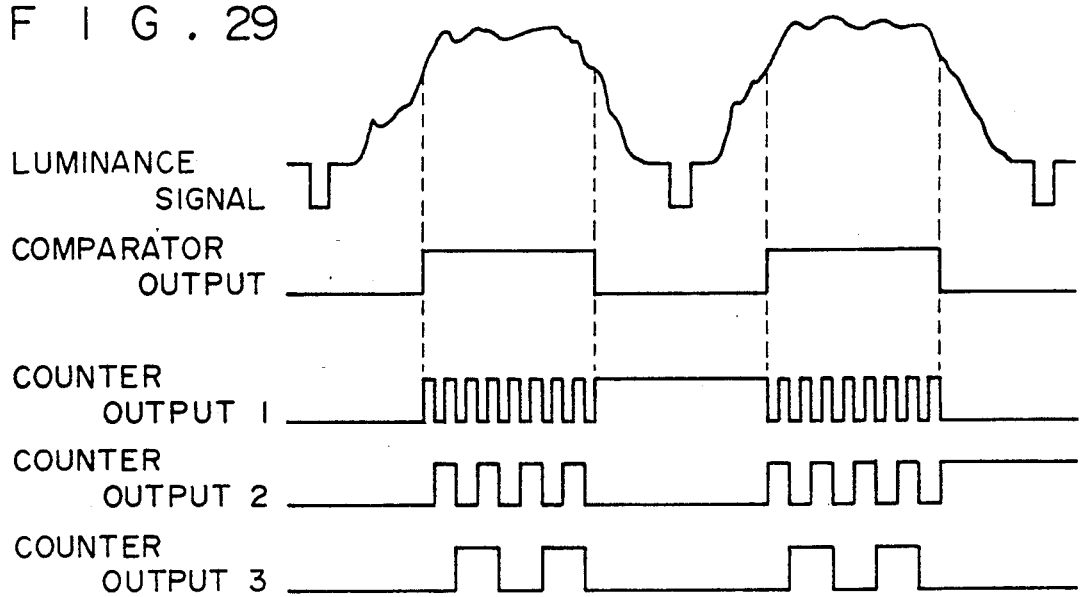
FIG. 29 is a circuit diagram showing the structure of one embodiment of a camera exposure control device according to the present invention.

The outputs of the individual comparators 24 are inputted to individual counters 25, which are fed with clock signals CR commonly with the individual comparators 24. Moreover, the individual counters 25 count the clock signals CR, as shown in FIG. 29, while the outputs of the comparators 24 are at the H level, i.e., exceed the lower limit levels of the individual luminance regions. The frequencies of the clock signals CR are determined depending upon the target accuracy and the bit number of the counters 25. If the counters 25 have 16 bits, for example, the frequencies are calculated by $64K \times 60 = 3840K \approx 3.8$ MHz because the time period for reading one frame in the case of the electronic still camera is 1/60 secs.

In order to obtain the signals of wide luminance regions, a plurality of exposures are accomplished under different exposure conditions. For example, the exposures are accomplished twice at 1/1000 and 1/60 for F5.6 (in which the image pickup element has a sensitivity of ISO100). If the signal level has a saturation of 120% and a proper level of 80%: for F5.6 and 1/1000, 80% for 15 Lv (40 to 120% for 14 to 16 Lv), 40% for 14 Lv (20 to 80% for 13 to 15 Lv), 20% for 13 Lv (10 to 40% for 12 to 14 Lv), and 10% for 12 Lv (for 11 to 13 Lv, 80% for F5.6 and 1/60 to 20% for F5.6 and 1/1000); and for F5.6 and 1/60, 80% for 11 Lv (for 10 to 12 Lv, 40% for F5.6 and 1/60 to 10% for F5.6 and 1/1000), 40% for 10 Lv (20 to 80% for 9 to 11 Lv), 20% for 9 Lv (10 to 40% for 8 to 10 Lv), and 10% for 8 Lv (0 to 20% for 7 to 9 Lv).

Here, for 16 Lv or more, the level is extremely high as in a fine weather and for an outdoor photographing. For 7 Lv or less, the level is low as in the surroundings in which an auto-strobe can flash. Thus, the luminance regions necessary for the ordinary photometry can be covered with the aforementioned twice exposures.

Figure 30:
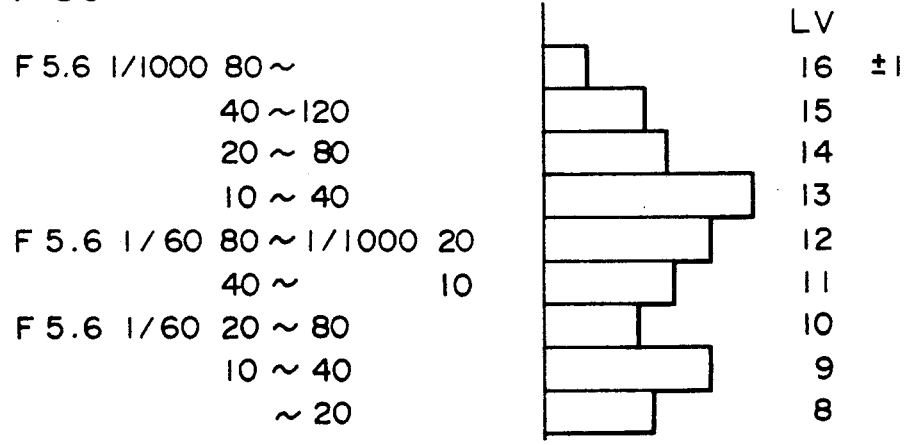
FIGS. 30 and 31 are graphs presenting the histograms of the luminance region areas in the individual photographings.

A CPU 26 for the AE reads out the values of the individual counters 25 to prepare a histogram of the areas (i.e., the number of picture elements) of the photographic frames corresponding to the counted values of the luminance regions, as shown in FIG. 30.

Here, the luminance values are set at an interval of 1 Lv, and the histogram of the luminance regions within a range of $\pm 1$ Lv, but not limitative.

By making a judgement from the histogram, the AE is accomplished in conformity to the highest peak. In the example of FIG. 30, the AE is accomplished to 13 Lv. Specifically, the speed of a shutter 28 is controlled to control the exposure time by a shutter drive circuit 27 so that the portion of 13 Lv may taken the optimum signal level. In the AE of the prior art, the control is accomplished according to 12 Lv by the existing of the peak of 9 Lv. In this case, the object of 13 Lv is so bright that it is blanked white whereas an object of 9 Lv is blanked black. As a result, few objects have a proper signal level (or brightness) so that an excellent image cannot be obtained. According to the AE of the present embodiment, however, the portion having a large area at the identical signal level can be grasped as the main object, according to which the control is accomplished, so that the area at the proper signal level is increased to form the excellent image.

Since, moreover, the luminance regions are finely divided for evaluations, substantially proper exposure conditions can be determined by the twice exposures to shorten the time period required for the determinations.

Figure 31:
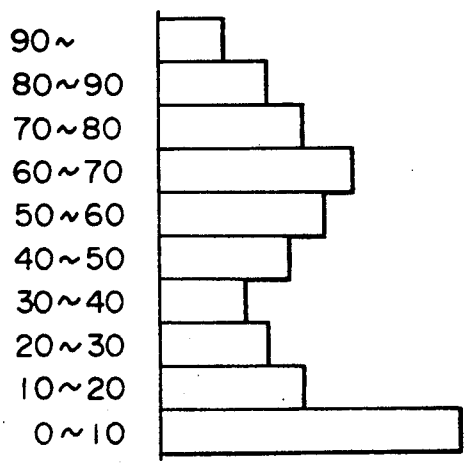

In order to raise the accuracy of the AE, the image pickup is accomplished again under the exposure condition judged from the aforementioned histogram, and a similar histogram is prepared from the result. If the result of FIG. 31 is obtained, the peak is extends around 60%. If the optimum value has a shape of a peak extending around 70%, the control is made to accomplish the AE by multiplying the exposure time by 7/6.

It is more effective that AE of this type and the bracketing (for taking a plurality of the shots) are combined. In case the histogram has one peak, for example, the photographing may be accomplished by adjusting the AE to that peak. If there are a plurality of peaks, the photographing is accomplished by adjusting the AE to the individual peaks.

In the bracketing of the prior art, the photographing is accomplished under slightly different exposure conditions so as to adjust the exposure of the main object accurately. Since the photometry is accomplished separately for the areas of the frame, as has been described hereinbefore, neither the method of weighting the center nor the multidivision method is so influenced by the portion, if any in the vicinity of the main object, having a large luminance difference that it cannot make a control to an accurate exposure. In order to compensate this, the bracketing is accomplished. However, the user has to judge whether it is necessary to accomplish the bracketing, namely, whether or not the accurate exposure can be obtained by the ordinary photometry. The user also has to judge the change in the exposure conditions and the number of steps (i.e., the number of shots). Even in the so-called "auto-bracketing", more specifically, what is automatic is restricted to the photographing operations (e.g., the exposure condition changing operations or the film winding operations) for the photographing according to the step number and the change in the exposure conditions set by the judgement of the user. On the contrary, the bracketing of the present embodiment is intended to accomplish the photographing conforming to the individual exposures in case there are a plurality of objects having large luminance differences. All the operations including the judgement of necessity for the bracketing from the aforementioned histogram, the change, if necessary, in the exposure conditions and the setting of the step number can be automatically accomplished by the camera.

In case the main object is located at the center of the frame and occupies a large area, the photographing with an accurate exposure can be accomplished even in the prior art without any troublesome operation. In case, however, the main object is small and offset from the center, the troublesome operations are required for ensuring the accurate exposure. This automation is tried by a variety of algorithms using the divided photometry, but a sufficient one is not obtained yet. According to the present method, the single shot in the bracketing is obtained to have its main object adjusted to the exposure where the main object might be positioned or how small the same might be. Thus, the present method can cope with all the cases sufficiently other than a case in which the main object is extremely small. Especially in the case of the electronic still camera, the cost for one shot is low, and the unnecessary images can be deleted. Thus, the bracketing of the present method can have a high utility.

In the case of the present embodiment, moreover, the downstream steps of the comparator 24 may be wholly digitally processed, and the analog portion may be merely a comparator, so that the device of the present embodiment can be easily integrated (in the form of the gate array). Since the image signals are already digitized in the electronic still camera of the type for digitizing the image signals to be stored in a semiconductor memory, the photometory and exposure controls can be realized by the digital circuit only so that the integration can be further promoted.

Moreover, the present embodiment can be applied not only to the electronic still camera, as has been described hereinbefore, but also to the silver halide film type camera. In the latter application, an image pickup element having a small number of picture elements may be disposed in the finder for the photometory. In the case of the silver halide film, moreover, the running cost is high. As to the bracketing, therefore, it is recommended to accomplish the bracketing not automatically by the camera but by informing the user of a warning, if judged necessary, so that the user may be convinced of the bracketing.

Figure 32:
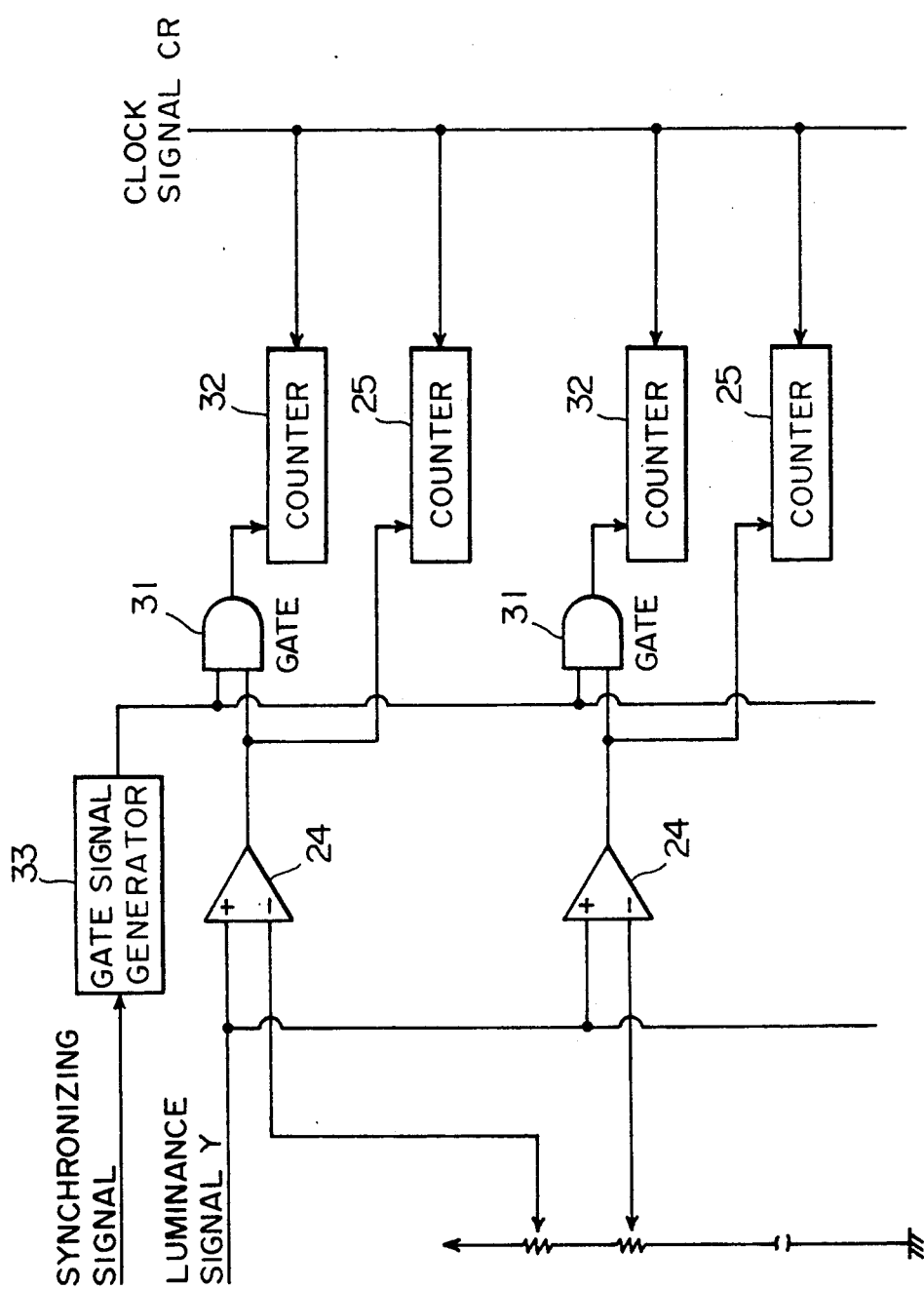
FIG. 32 is a circuit diagram showing the structure of a second embodiment.

Although the foregoing description has failed to touch the weighting according to the positions in the frame, the main object is frequently set, as customary, at the center. A satisfactory result can be frequently obtained if the AE is accomplished while weighting the central portion. The structure for exemplifying the embodiment for this weighting is shown in FIG. 32.

In this structure, in addition to the structure shown in FIG. 28, luminance region gates 31 and second counters 32 are provided, and a gate signal generator 33 is provided for inputting such a gate signal to one input terminal of each of the gates 31 as will take the H level at the central portion of the frame. The gate signal generator 33 is constructed, as shown in FIG. 33, for example, to output a signal, as shown in FIG. 34. Specifically, a one-shot pulse circuit 41 is triggered by the break of a vertical synchronizing signal $V_{SYNC}$ in the image pickup signal to output a one-shot pulse A so that a one-shot pulse circuit 42 is triggered by the break of said one-shot pulse A to output a one-shot pulse B.

In dependence upon the pulse width of the one-shot pulse B, the vertical width of the central portion for the aforementioned weighting is regulated.

A one-shot pulse circuit 43 is triggered by the break of a horizontal synchronizing signal $H_{SYNC}$ of the image pickup signal inputted, while the aforementioned one-shot pulse B is being outputted, to output a one-shot pulse C. The width of the lefthand portion of the frame, which is left unweighted, is regulated in dependence upon the pulse width of the one-shot pulse C.

A one-shot pulse circuit 44 is triggered by the break of the aforementioned one-shot pulse C to output a one-shot pulse D. The pulse width of this one-shot pulse D regulates the horizontal width for the weighting, to construct a gate signal which takes the H level at the central portion for the final weighting.

The other terminals of the individual gates 31 are fed with the outputs of the individual comparators 24 of the corresponding luminance regions so that the outputs of the individual gates 31 are inputted to the aforementioned corresponding individual counters 32. These individual counters 32 are fed with the aforementioned clock signals CR to count the clock signals CR while the outputs of the gates 31 are at the H level. In other words, the individual gates 31 belong to the corresponding luminance regions and take the H level, only when they belong to the central portion of the frame, so that the corresponding counters 32 accomplish the counting operations during said H level. As a result, the areas (or the number of picture elements) of the individual luminance regions at the central frame portion are independently detected.

Considering the data of both the areas of the individual luminance regions of the whole frame and the areas of the individual luminance regions of only the central frame portion, the CPU 26 prepares a histogram, in which a suitable weighting is made at the central portion, to determine the exposure.

The method thus far described is given high merits by having a high degree of weighting freedom and can be used for judgement of the backlight but is rather complicated in its circuit structure. In another simpler method, therefore, the structure is provided, as shown in FIG. 35, with two oscillators 51 and 52 for generating clock signals of different frequencies ($f_1$ and $f_2$; $f_1 > f_2$), and a selector circuit 53 for selectively outputting the clock signals coming from those oscillators 51 and 52. In another method, moreover, at the central frame portion in which the gate signal coming from the gate signal generator 33 similar to that shown in FIG. 33 takes the H level, the selector circuit 53 can switch its outputs between the clock signals coming from the oscillator 51 and having a high frequency and the clock signals coming from the oscillator 52 and having a low frequency to cause the counters 25 to accomplish the counting action. According to this method, only one weighting is determined depending upon the frequency so that the backlight cannot be judged, but the circuit structure can be simplified to reduce the cost.

Moreover, the bracketing judging method should not be limited to the case, in which the histogram has the plural peaks, but the following method can be conceived.

For example, the photographing is made in conformity to the peak value of the histogram, and the total area at the normal level of the image is measured to determine the occupied ratio of the whole frame. If the ratio is equal to or lower than a predetermined value, the bracketing is accomplished. This method covers the case in which the histogram has the plural peaks or in which the level difference is large between the high and low luminance portions having large areas. Since the total area at the normal level is short even if the exposure is adjusted to either luminance region, one shot finds it difficult to accomplish the photographing having its exposure adjusted to the desired object. The single shot can neither be accomplished for the wide luminance distribution even in case a clear image is to be formed for each of the plural objects. Therefore, the bracketing is accomplished such that the total (OR) area of the ordinary portions of the plural shots may exceed a predetermined value.

For 70% for the first shot, 85% for the second shot, 92% for the third shot, 98% for the fourth shot and 99.5% for the fifth shot, three bracketings are accomplished if the predetermined value is 90%. If this predetermined value is 95% or 99%, four or five bracketings are accomplished. Since, at each predetermined value, no exposure may be adjusted to the object having a size of 10% or less, 5% or less, or 1% or less, the aforementioned predetermined value is determined depending upon the increases in the performance and the number of shots.

Specifically, the luminance regions for adjusting the exposure are determined not by merely adjusting the exposure to a large value of the histogram for the second and later shots, although the photographing is made in conformity to the peak value for the first shot, and but by how large the regions of the ordinary level are to be enlarged. In the case of the histogram of FIG. 36, for example, the first shot has its exposure adjusted to the 13 Lv of the peak value, and the second shot has a next peak at 12 Lv. Since the ordinary level can be considerably covered (because of large superposed portions) for the photographing of the first shot conforming to the peak of 13 Lv, the photographing is taken to have the exposure adjusted selectively to 11 Lv. For the third shot, assuming that the value of 14 Lv be substantially covered by the value of 13 Lv and that the value of 10 Lv be covered by the value of 11 Lv, the photographing is accomplished to adjust the exposure by selecting the value of 9 Lv. Thus, selections are so made to augment the regions at the ordinary level efficiently with the number of shots as small as possible.

According to the bracketing method of the present invention thus far described, even the bracketings for the high- and low-luminance sides are accomplished in conformity to the luminance region having a larger area. Even if the main objects includes an independent object having an extremely high brightness, no influence is exerted for the small area. Since, moreover, the photographic conditions are determined prior to the photographing, a plurality of shots are promptly taken with little discrepancy of the exposure timing. Since the shot number is not limited to the two, it is highly possible that the photographing has its exposure conforming highly accurately to the main object.

Incidentally, in the above-specified embodiment, the comparators 24, the counters 25, 32, the gates 31, the gate signal generator 33 and the CPU 26 constitute the luminance area detecting means, whereas the CPU 26, the shutter driver 27 and the shutter 28 constitute the exposure control means. Moreover, the exposure control may be controlled by a diaphragm.

As has been described hereinbefore, according to this embodiment of the present invention, the exposure control for the actual photographing is accomplished by preparing the histogram of the luminance areas from the photographing under the predetermined conditions and by increasing the areas of the proper signal levels on the basis of the histogram. As a result, the main object can be properly grasped to effect the control having the adjusted exposure.

Even in case, moreover, a plurality of photographs are taken under varied conditions so as to raise the set accuracy of the exposure, the conditions are automatically set before the photographing so that the time period required for determining the exposure can be shortened.

By accomplishing the bracketing in association with the aforementioned exposure control, moreover, it is possible to cope with the cases in which the main object cannot be determined and in which a plurality of objects are to be photographed with adjusted exposures.

What is claimed is:

1. An electronic still camera comprising
   image pick-up means for photographing a single object to generate a plurality of images having different exposure times,
   means for controlling sweeping and recording operations for each of at least two fields of differing light luminances exposed to said image pick-up device, said sweeping and reading operations for each of said fields being conducted independently whereby, exposures having different exposure times corresponding to said light luminances are generated in a continuous or overlapped manner, and
   means for recording the exposed images.

2. An electronic still camera comprising a photometric element for detecting a luminance of an object,
   means to automatically adjust exposure with reference to a specific luminance when luminance level varies over the luminance of said object,
   means for selecting at least two characteristic luminance region within the luminance distribution of said object obtained by said photometric element,
   means for determining an exposure condition suitable for each of said selected luminance regions, and
   means for automatically bracketing, on the basis of said exposure conditions.

3. An electronic still camera for digitizing video signals to record them on a recording medium, said apparatus comprising,
   photometric means for detecting a luminance of an object being photographed,
   means for automatically adjusting exposure with reference to a luminance distribution of said object,
   means for selecting at least two characteristic luminance region from said luminance distribution,
   means for determining an exposure condition suitable for each selected luminance region,
   means for automatically bracketing, based on a plurality of exposure conditions corresponding to each of said selected luminance regions,
   memory means for recording images, and
   discriminating means, whereby signals of second and subsequent images are recorded only when signal levels are within a proper range based on a corresponding luminance region, but are outside the proper range of the image corresponding to the proceeding image.

4. An electronic still camera for digitizing video signals comprising a photometric element for reading a luminance distribution of an object to be photographed,
   means for selecting at least two characteristic luminance region from said luminance distribution,
   means for determining an exposure condition suitable for each of the selected luminance regions,
   means for automatically bracketing on the basis of said exposure conditions, and
   means for continuously recording at least a first to third image based on said exposure condition, the first image being recorded under an intermediate exposure condition corresponding to an intermediate luminance region, the second and third images being recorded over and under said intermediate exposure condition, respectively,
   memory means, and
   discriminating means, for discriminating between generated signals whereby said second image is recorded in said memory only in regions corresponding to black-blanked regions in said first image, and said third image is recorded only in regions corresponding to white blanked regions of said first image.

5. An exposure control device for a camera comprising means for selecting at least two characteristic luminance regions along a luminance distribution of a photographic frame, said luminance regions being divided according to a luminance level of an image pick up signal detected by an image pick-up device during photography under a set condition, and exposure control means for controlling exposure at a time a photograph is taken so that a luminance distribution on the object being photographed can be adjusted for so that a proper signal level can be achieved.

6. The exposure control device of claim 5 wherein said luminance area detecting means detects the area of each luminance level on the basis of a plurality of photographic exposures made under different exposure conditions.

7. The exposure control device of claim 5 wherein a plurality of luminance regions along said luminance distribution are detected by said luminance area detecting means, said exposure control device further comprising photographic control means for adjusting the exposure of the luminance regions to proper signal levels during a plurality of photographic exposures made under different exposure conditions.

8. The exposure control device of claim 5 wherein a level of luminance regions at proper signal level detected by said luminance area detecting means are less than a predetermined value, said device further comprising photographic control means for generating a plurality of photographic exposures at varying exposure conditions.

* * * * *